US012374674B2

(12) United States Patent
Chiu et al.

(10) Patent No.: US 12,374,674 B2
(45) Date of Patent: Jul. 29, 2025

(54) SEMICONDUCTOR STRUCTURE AND SEMICONDUCTOR DEVICE

(71) Applicant: SERIPHY TECHNOLOGY CORPORATION, Hsinchu County (TW)

(72) Inventors: Tzu-Wei Chiu, Hsinchu County (TW); Chun-Wei Chang, Taipei (TW); Shang-Pin Chen, Hsinchu County (TW); Wei-Chih Chen, Taoyuan (TW); Che-Yen Huang, Hsinchu County (TW)

(73) Assignee: SERIPHY TECHNOLOGY CORPORATION, Hsinchu County (TW)

( * ) Notice: Subject to any disclaimer, the term of this patent is extended or adjusted under 35 U.S.C. 154(b) by 473 days.

(21) Appl. No.: 18/047,146

(22) Filed: Oct. 17, 2022

(65) Prior Publication Data

US 2024/0128252 A1    Apr. 18, 2024

(51) Int. Cl.
*H01L 25/18*    (2023.01)
*H01L 23/00*    (2006.01)
*H01L 23/48*    (2006.01)
*H01L 23/522*   (2006.01)

(52) U.S. Cl.
CPC ............ *H01L 25/18* (2013.01); *H01L 23/481* (2013.01); *H01L 23/5226* (2013.01); *H01L 24/08* (2013.01); *H01L 2224/08145* (2013.01)

(58) Field of Classification Search
CPC .... H01L 25/18; H01L 23/481; H01L 23/5226
See application file for complete search history.

(56) References Cited

U.S. PATENT DOCUMENTS

| | | | |
|---|---|---|---|
| 9,142,262 B2 * | 9/2015 | Ware | G11C 17/18 |
| 10,128,229 B1 * | 11/2018 | Davis | H01L 24/48 |
| 11,824,041 B2 * | 11/2023 | Bohr | H01L 23/5226 |
| 12,009,349 B2 * | 6/2024 | Chang | H01L 25/50 |
| 12,230,613 B2 * | 2/2025 | Chang | H01L 21/568 |
| 2012/0201068 A1 * | 8/2012 | Ware | G11C 11/4093 438/109 |

(Continued)

FOREIGN PATENT DOCUMENTS

| | | | | |
|---|---|---|---|---|
| CN | 115458418 A | * | 12/2022 | ............ H01L 21/56 |
| CN | 117915669 A | * | 4/2024 | ........... H01L 23/481 |

(Continued)

*Primary Examiner* — Laura M Menz
(74) *Attorney, Agent, or Firm* — WPAT, P.C.; Anthony King

(57) ABSTRACT

The present application discloses a semiconductor structure. The semiconductor structure a top die and a bottom die, and the maximum die size is constrained to reticle dimension. Each die includes (1) core: computation circuits, (2) phy: analog circuit connecting to memory, (3) I/O: analog circuit connecting output elements, (4) SERDES: serial high speed analog circuit, (5) intra-stack connection circuit, and (6) cache memory. This semiconductor structure can be chapleted design for high wafer yield with least tape out masks for cost saving. The intra-stack connection circuit connects the top die and the bottom die in the shortest distance (about tens of micrometers), so as to provide high signal quality and power efficiency.

24 Claims, 19 Drawing Sheets

(56) References Cited

U.S. PATENT DOCUMENTS

| | | | |
|---|---|---|---|
| 2013/0032950 A1* | 2/2013 | Ware | H01L 25/0657 257/774 |
| 2013/0256908 A1* | 10/2013 | Mclaurin | H01L 25/0657 438/109 |
| 2018/0211701 A1* | 7/2018 | Ware | G11C 17/18 |
| 2020/0219799 A1* | 7/2020 | Somma | H01L 23/4952 |
| 2021/0163021 A1* | 6/2021 | Frazzoli | H04W 4/48 |
| 2022/0199561 A1* | 6/2022 | Kim | H01L 25/105 |
| 2022/0310570 A1* | 9/2022 | Chang | H01L 24/09 |
| 2023/0065941 A1* | 3/2023 | Tsai | H01L 21/568 |
| 2023/0146621 A1* | 5/2023 | Yoo | H01L 25/50 257/668 |
| 2023/0387089 A1* | 11/2023 | Chang | H01L 25/105 |
| 2024/0071937 A1* | 2/2024 | Agarwal | H01L 23/49816 |
| 2024/0120282 A1* | 4/2024 | Chiu | H01L 24/08 |
| 2024/0128252 A1* | 4/2024 | Chiu | H01L 23/481 |
| 2024/0203483 A1* | 6/2024 | Ware | G11C 11/4093 |
| 2024/0203848 A1* | 6/2024 | Chiu | H01L 23/5383 |
| 2024/0203925 A1* | 6/2024 | Chiu | H01L 23/5389 |
| 2024/0203941 A1* | 6/2024 | Chiu | H01L 24/20 |
| 2024/0243068 A1* | 7/2024 | Chiu | H01L 23/5384 |
| 2024/0250002 A1* | 7/2024 | Yu | H01L 24/20 |
| 2024/0371841 A1* | 11/2024 | Chang | H01L 23/585 |
| 2024/0395756 A1* | 11/2024 | Tsai | H01L 23/5385 |
| 2024/0413069 A1* | 12/2024 | Chiu | H01L 24/05 |
| 2025/0006696 A1* | 1/2025 | Lee | H01L 23/5383 |
| 2025/0062279 A1* | 2/2025 | Kang | H01L 24/32 |
| 2025/0062286 A1* | 2/2025 | Chung | H01L 21/6835 |

FOREIGN PATENT DOCUMENTS

| | | | | |
|---|---|---|---|---|
| DE | 112019005425 T5 | * | 7/2021 | B60W 30/09 |
| DE | 102020108481 B4 | * | 7/2023 | H01L 21/4853 |
| GB | 2610938 A | * | 3/2023 | B60W 30/09 |
| GB | 2613298 A | * | 5/2023 | B60W 30/09 |
| GB | 2613509 A | * | 6/2023 | B60W 30/09 |
| GB | 2613740 A | * | 6/2023 | B60W 30/09 |
| WO | WO-2010138480 A2 | * | 12/2010 | G06F 13/362 |
| WO | WO-2011049710 A2 | * | 4/2011 | G11C 11/4093 |
| WO | WO-2011139496 A2 | * | 11/2011 | G06F 3/0604 |
| WO | WO-2012082092 A1 | * | 6/2012 | H01L 21/50 |
| WO | WO-2017052496 A1 | * | 3/2017 | H04L 69/16 |
| WO | WO-2018125767 A2 | * | 7/2018 | H01L 21/76898 |
| WO | WO-2020092635 A1 | * | 5/2020 | B60W 30/09 |
| WO | WO-2024049546 A1 | * | 3/2024 | H01L 23/145 |
| WO | WO-2024060329 A1 | * | 3/2024 | |

* cited by examiner

US 12,374,674 B2

SEMICONDUCTOR STRUCTURE AND SEMICONDUCTOR DEVICE

TECHNICAL FIELD

The present disclosure relates to a semiconductor structure, and more particularly, to a semiconductor structure having stacked dies.

DISCUSSION OF THE BACKGROUND

Although 3D die-stacking technology allows electronic devices to have greater computation capability in a smaller area with lower power, its manufacturing process is also more complicated than a traditional manufacturing process for producing a single die. For example, to simplify routing and connection between different dies, dies having same functionalities will be produced in different versions, so as to provide different arrangements for input/output pads. In such case, even for dies having same functionalities, multiple sets of high-cost lithographic masks are required, which increases not only complexity but also cost of manufacturing. In addition, through silicon vias (TSVs) adopted in the 3D die-stacking technology can interfere with operations of circuits related to analog signals, such as input/output (I/O) circuits and physical interface circuits, such as PHY, which makes designing a floorplan and arrangement of stacked dies even more difficult. Therefore, how to provide stacked dies that can simplify the manufacturing process and reduce the cost has become an issue to be solved.

SUMMARY

One embodiment of the present disclosure discloses a semiconductor structure. The semiconductor structure includes a first die and a second die. The first die includes a first substrate, a first device layer disposed on the first substrate, and a first redistribution layer (RDL) disposed on the first device layer, and a plurality of through silicon vias (TSVs) at least passing through the first substrate. A first computation circuit, a first memory circuit, and a first intra-stack connection circuit are formed in the first device layer and the first RDL. The second die includes a second substrate, a second device layer disposed on the second substrate, and a second RDL disposed on the second device layer. A second computation circuit, a second memory circuit, and a second intra-stack connection circuit are formed in the second device layer and the second RDL. From a top view, pads of the second intra-stack connection circuit are aligned with pads of the first intra-stack connection circuit, and the first computation circuit is coupled to the second computation circuit and the second memory circuit through the first intra-stack connection circuit and the second intra-stack connection circuit. Structures of the first device layer and the first RDL are replica of structures of the second device layer and the second RDL.

Another embodiment of the present disclosure discloses a semiconductor device. The semiconductor device includes at least one dynamic random-access memory (DRAM), and a first semiconductor structure. The first semiconductor structure includes a first die and a second die. The first die includes a first substrate, a first device layer disposed on the first substrate, and a first redistribution layer (RDL) disposed on the first device layer, and a plurality of through silicon vias (TSVs) at least passing through the first substrate. A first computation circuit, a first memory circuit, and a first intra-stack connection circuit are formed in the first device layer and the first RDL. The second die includes a second substrate, a second device layer disposed on the second substrate, and a second RDL disposed on the second device layer. A second computation circuit, a second memory circuit, and a second intra-stack connection circuit are formed in the second device layer and the second RDL. At least one DRAM is coupled to the first computation circuit. From a top view, pads of the second intra-stack connection circuit are aligned with pads of the first intra-stack connection circuit, and the first computation circuit is coupled to the second computation circuit and the second memory circuit through the first intra-stack connection circuit and the second intra-stack connection circuit. Structures of the first device layer and the first RDL are replica of structures of the second device layer and the second RDL.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to unnecessarily limit the present disclosure. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
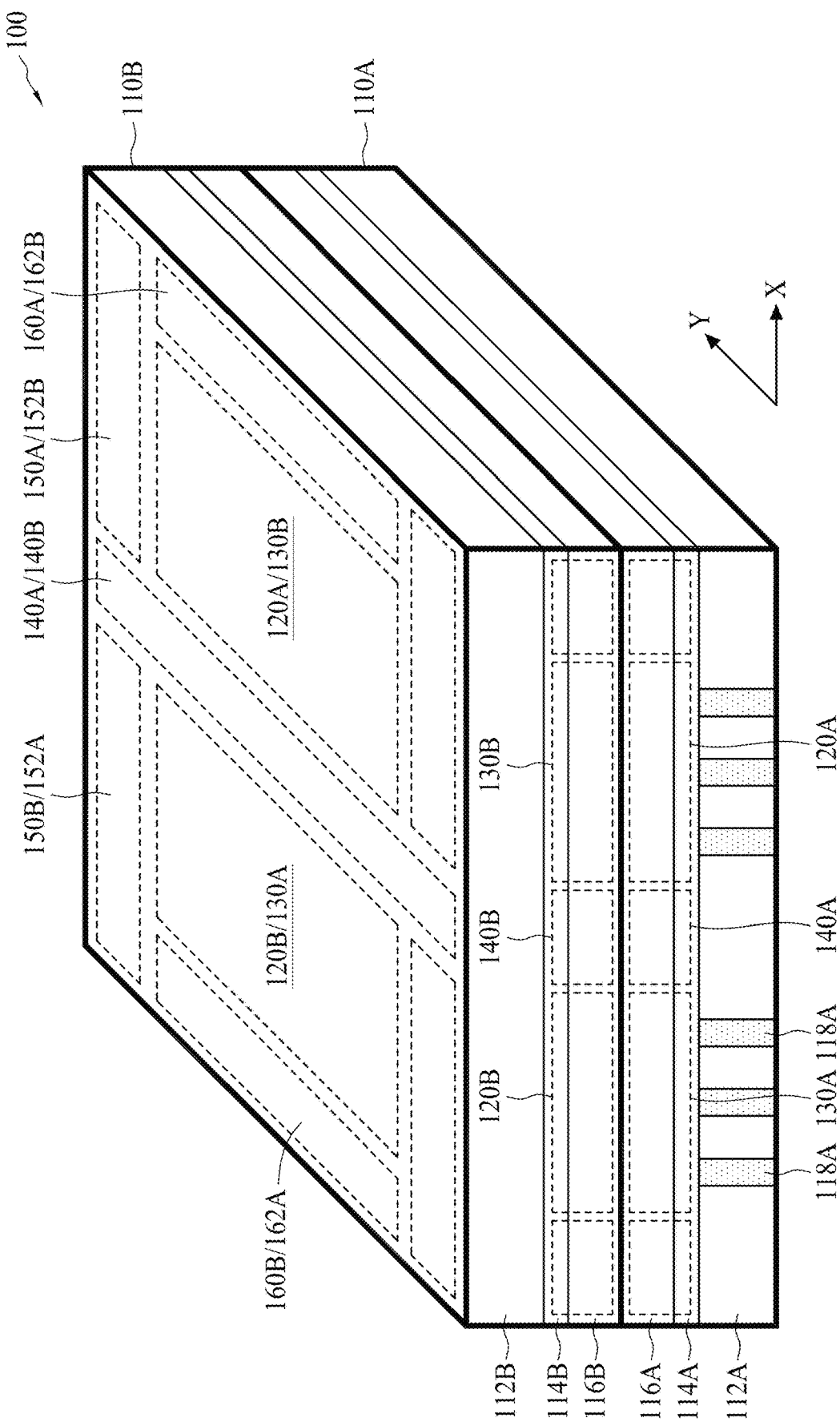
FIG. 1 shows a semiconductor structure according to one embodiment of the present disclosure.

FIG. 1 shows a semiconductor structure 100 according to one embodiment of the present disclosure. The semiconductor structure 100 includes two dies 110A and 110B with the die 110B stacked on the die 110A. In the present embodiment, the dies 110A and 110B can include same circuits, and the circuits can be formed in the dies 110A and 110B with a same set of lithographic masks. Therefore, a manufacturing process of the semiconductor structure 100 can be simplified and costs of multiple sets of masks (or reticles) required by the prior art can be reduced. In the present embodiment, the sizes of the dies 110A and 110B can be up to 26 mm×33 mm (about 850 mm$^2$). However, the present disclosure is not limited thereto, in some other embodiments, the sizes of the dies 110A and 110B may be even greater and may be constrained by the maximum feasible dimension of the reticles.

As shown in FIG. 1, the die 110A includes a substrate 112A, a device layer 114A, a redistribution layer (RDL) 116A, and a plurality of through silicon vias (TSVs) 118A. The device layer 114A can be disposed on the substrate 112A, and the RDL 116A can be disposed on the device layer 114A. In the present embodiment, a computation circuit 120A, a memory circuit 130A, and an intra-stack connection circuit 140A can be formed in the device layer 114A and the RDL 116A. For example, the device layer 114A may include doped regions and gate structures to form transistors, such as metal-oxide-silicon field effect transistor (MOSFET), required for the circuits 120A, 130A and 140A. In addition, the RDL 116A may include a plurality of metal layers for providing electrical connections and a plurality of insulating layers for insulating different layers of metals.

Similarly, the die 110B includes a substrate 112B, a device layer 114B, and an RDL 116A. The device layer 114B can be disposed on the substrate 112B, and the RDL 116B can be disposed on the device layer 114B. In the present embodiment, a computation circuit 120B, a memory circuit 130B, and an intra-stack connection circuit 140B can be formed in the device layer 114B and the RDL 116B. In the present embodiment, components of the circuits 120B, 130B, and 140B are formed in the device layers 114B and RDL 116B instead of the substrate 112B, so the dotted blocks shown on the surface of the substrate 112B in FIG. 1 are mainly to indicate the floorplans of the circuits 120B, 130B, and 140B.

Furthermore, in the present embodiment, the computation circuit 120A and the computation circuit 120B can have a same structure, and can each be adopted as a processing core of a multi-core system. In addition, the memory circuit 130A and the memory circuit 130B can have a same structure, and the intra-stack connection circuit 140A and the intra-stack connection circuit 140B can have a same structure. The intra-stack connection circuits 140A and 140B can be used for connecting the dies 110A and 110B. For example, the computation circuit 120A can be coupled to the memory circuit 130B through the intra-stack connection circuits 140A and 140B, and the computation circuit 120B can be coupled to the memory circuit 130A through the intra-stack connection circuits 140A and 140B. That is, the semiconductor structure 100 can include two chiplets: one with the computation circuit 120A and the memory circuit 130B and another with the computation circuit 120B and the memory circuit 130A. In some embodiments, the intra-stack connection circuits 140A and 140B may also be used to couple the computation circuit 120A to the computation circuit 120B, thereby allowing data sharing between the two computation circuits 120A and 120B.

Figure 2:
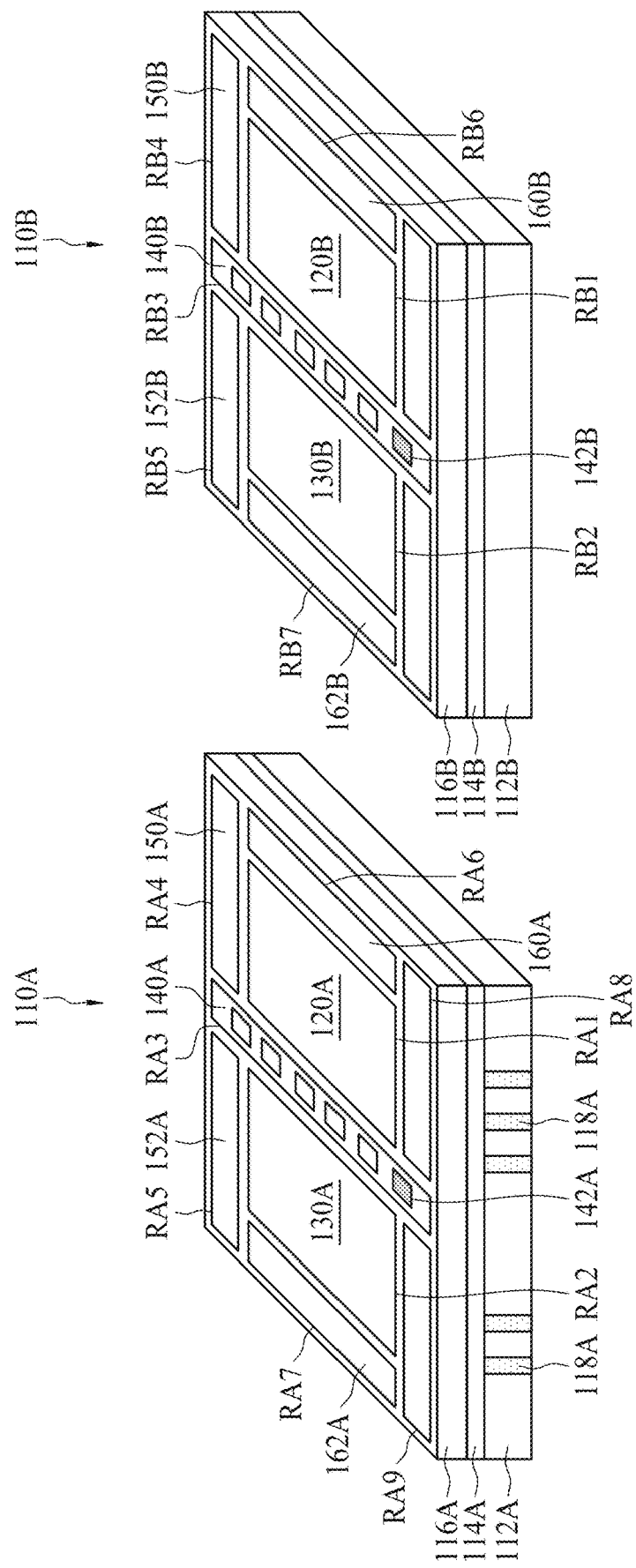
FIG. 2 shows a top view of dies of the semiconductor structure in FIG. 1 before the dies are stacked.

In the present embodiment, the dies 110A and 110B can have same circuit floorplans. FIG. 2 shows a top view of the dies 110A and 110B with the RDLs 116A and 116B facing upward before the dies 110A and 110B are stacked. As shown in FIG. 2, floorplans of the computation circuit 120A, the memory circuit 130A and the intra-stack connection circuit 140A in the die 110A are same as floorplans of the computation circuit 120B, the memory circuit 130B and the intra-stack connection circuit 140B in the die 110B. For example, the computation circuit 120A can be formed at a right region RA1 in the die 110A, the memory circuit 130A can be formed at a left region RA2 of the die 110A, and the intra-stack connection circuit 140A can be formed in a region RA3 between the right region RA1 and the left region RA2.

Furthermore, the device layer 114A and the RDL 116A within the regions RA4 and RA5 may be used to implement input/output circuits 150A and 152A for receiving and transmitting signals from and to external devices, the device layer 114A and the RDL 116A within the regions RA6 and RA7 may be used to implement physical interface circuits 160A and 162A, such as PHY, for communicating with external dynamic random-access memories (DRAMs). In some embodiments, the device layer 114A and the RDL 116A within the regions RA8 or RA9 may be used to implement input/output circuits 150 and 152 a serializer/deserializer (SerDes) for serial high speed analog data transmission and reception, or may be used to implement an inter-stack connection circuit for providing connection to another semiconductor structure the device layer 114A and the RDL 116A within the region RA8 or RA9 may be used to implement a serializer/deserializer (SerDes) for serial high speed analog data transmission and reception, or may be used to implement an inter-stack connection circuit for providing connection to another semiconductor structure.

Similarly, the computation circuit 120B can be formed at a right region RB1 in the die 110B, the memory circuit 130B can be formed at a left region RB2 of the die 110B, and the intra-stack connection circuit 140B can be formed in a region RB3 between the right region RB1 and the left region RB2. In some embodiments, the computation circuits 120A and 120B may require more area than the memory circuits 130A and 130B, and the floorplans of the intra-stack connection circuits 140A and 140B may overlap the floorplans of the computation circuits 120A and 120B so as to remain at middles of the dies 110A and 110B.

Figure 3:
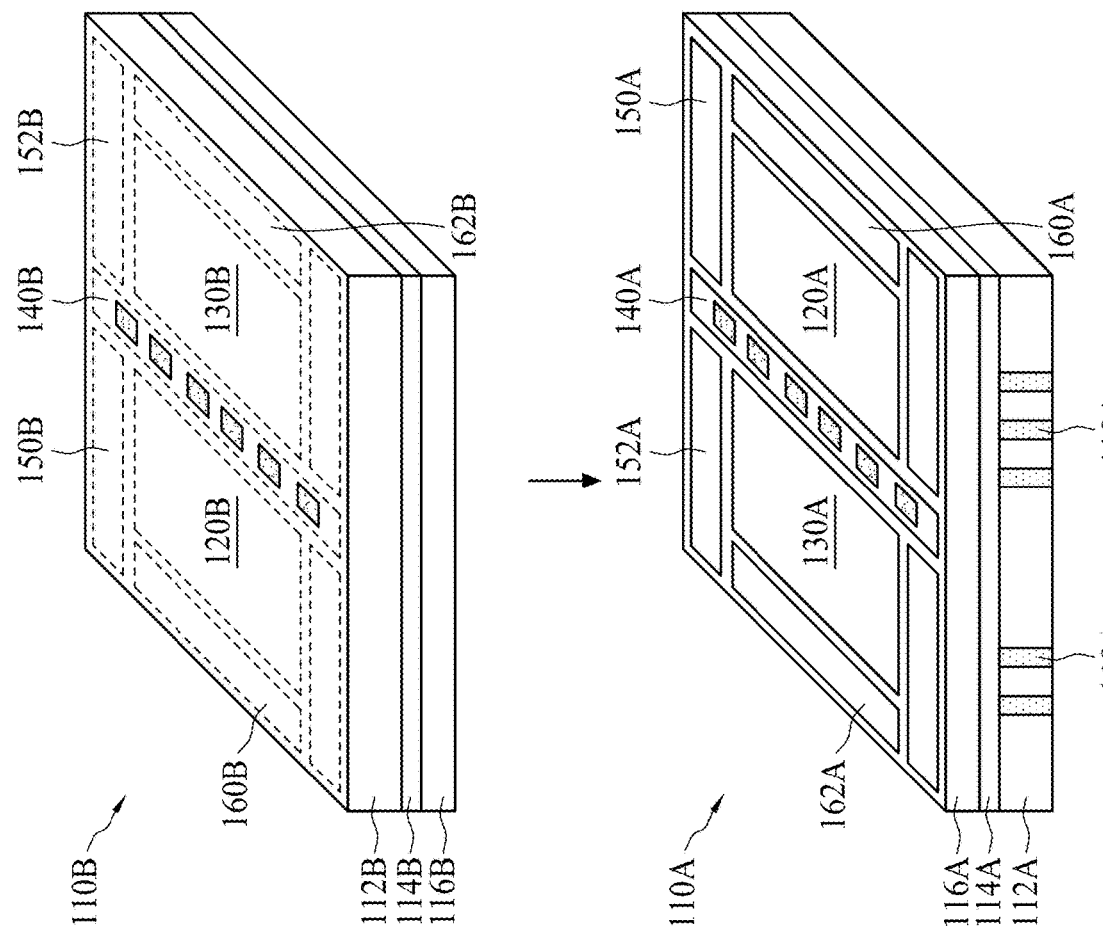
FIG. 3 shows an exploded top view of the semiconductor structure in FIG. 1.

In the present embodiment, the second die 110B can be flipped and rotated 180 degrees so as to be stacked on the die 110A. FIG. 3 shows an exploded top view of the semiconductor structure 100. As shown in FIG. 3, the floorplan of the computation circuit 120A may overlap the floorplan of the memory circuit 130B, and the floorplan of the computation circuit 120B may overlap the floorplan of the memory circuit 130A. In addition, the floorplans of the intra-stack connection circuits 140A and 140B can be in the middles of the dies 110A and 110B respectively so that pads 142A of the intra-stack connection circuit 140A and pads 142B of the intra-stack connection circuit 140B can remain aligned after the second die 110B is flipped and rotated. In such case, the pads 142B of the intra-stack connection circuit 140B can be coupled to the pads 142A of the intra-stack connection circuit 140A directly using hybrid bonding; however, the present disclosure is not limited thereto.

Consequently, the computation circuits 120A and 120B may access the memory circuits 130B and 130A through vertical connections between the dies 110A and 110B provided by the intra-stack connection circuits 140A and 140B so as to shorten signal paths and increase memory access speeds.

In the present embodiment, structures of the device layer 114A and the RDL 116A can be replicas of structures of the device layer 114B and the RDL 116B. That is, structures and the floorplans of the circuits 120A, 130A and 140A formed in the device layer 114A and the RDL 116A are same as structures and the floorplans of the circuits 120B, 130B and 140B formed in the device layer 114B and the RDL 116B. Therefore, the device layer 114A and the RDL 116A can be manufactured using a same set of masks as that used for manufacturing the device layer 114B and the RDL 116B, thereby reducing costs of creating different sets of masks.

Furthermore, since the second die 110B may be flipped and rotated before it is stacked on the die 110A, the pads 142A and 142B (indicated by shading in FIG. 2) will be coupled to each other. That is, the two pads 142A and 142B disposed at same relative positions within the dies 110A and 110B thereto and having a same function may be coupled to each other. In such case, to ensure that the pads 142A and 142B can be paired for signal transmission, the pads 142A and 142B can correspond to dual-direction connection ports of the intra-stack connection circuits 140A and 140B. That is, each of the pads 142A and 142B can be programmed in advance or controlled on-demand during operations to be a receiving port or a transmitting port according to system needs.

For example, the computation circuit 120A may control some of the pads 142A to receive signals as receiving ports and control some of the pads 142A to transmit signals as transmitting ports. Correspondingly, the computation circuit 120B may control the pads 142B that are aligned with those pads 142A that are used as receiving ports to be transmitting ports, and may control the rest of the pads 142B to be receiving ports. However, the present disclosure is not limited thereto. In some other embodiments, during a first period, the computation circuit 120A may control all the pads 142A to be transmitting ports, and the computation circuit 120B may control all the pads 142B to be receiving ports. Also, during a second period, the computation circuit 120A may control all the pads 142A to be receiving ports, and the computation circuit 120B may control all the pads 142B to be transmitting ports. That is, the pads 142A and 142B can be controlled as different types of ports in a time division manner.

In the present embodiment, the memory circuits 130A and 130B can be static random-access memory (SRAM) with each SRAM unit comprised of multiple transistors, for example, 6 transistors, so that the memory circuits 130A and 130B can be manufactured using a logic process same as that used for manufacturing the computation circuits 120A and 120B. However, the present disclosure is not limited thereto; in some other embodiments, the memory circuits 130A and 130B can be other types of memories that can be formed using manufacturing processes of logic components. For example, the memory circuits 130A and 130B may be magnetoresistive random-access memory (MRAM) or resistive random-access memory (RRAM). Since the MRAM and the RRAM can be manufactured using logic processes used for manufacturing computation circuits, the computation circuits 120A and 120B and the memory circuits 130A and 130B can be formed in the device layers 114A and 114B and the RDLs 116A and 116B with the same set of masks.

Furthermore, in the present embodiment, the TSVs 118A are formed in the die 110A, and thus, in addition to the masks used for forming the device layers 114A and 114B and the RDLs 116A and 116B, the manufacturing of the die 110A may further require at least one mask for forming the TSVs 118A. However, the TSVs 118A usually pass through the substrate 112A and reach the device layer 114A only, avoiding damaging the structure of the device layer 114A and the RDL 116A, so the TSVs 118A may be formed from a backside of the die 110A, that is, the outer surface of the substrate 112A. In addition, the TSVs 118A usually have greater dimensions than the dimensions of the metals in the RDL 116A, and thus, the cost of the mask for forming the TSVs can be rather low.

In addition, as shown in FIGS. 2 and 3, an input/output circuit 150A and an input/output circuit 152A may further be formed in the device layer 114A and the RDL 116A, and an input/output circuit 150B and an input/output circuit 152B may further be formed in the device layer 114B and the RDL 116B. Each of the input/output circuits 150A, 152A, 150B and 152B can be adopted as an input and output interface of the computation circuit 120A or 120B for receiving and transmitting signals.

In the present embodiment, the computation circuit 120A can be coupled to one of the input/output circuits 150A, 152A, 150B and 152B, and the computation circuit 120B can be coupled to another one of the input/output circuits 150A, 152A, 150B and 152B. That is, only two of the input/output circuits 150A, 152A, 150B and 152B are used by the corresponding computation circuits 120A and 120B respectively, while the remaining two of the input/output circuits 150A, 152A, 150B and 152B can be dummy circuits and not be coupled to either of the computation circuits 120A or 120B.

Figure 4:
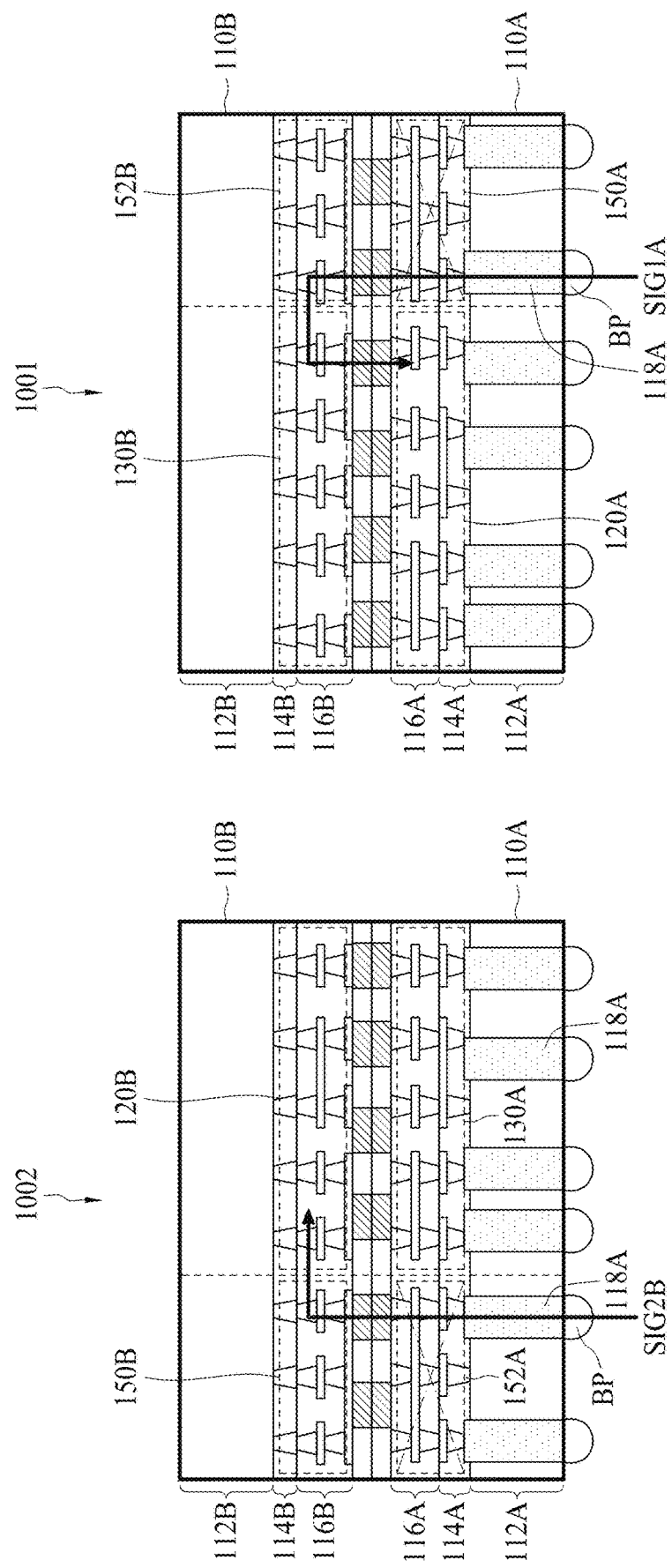
FIG. 4 shows cross-sectional views of two parts of the semiconductor structure in FIG. 1.

For example, in the present embodiment, the computation circuit 120A can be coupled to the input/output circuit 152B and the computation circuit 120B can be coupled to the input/output circuit 150B. FIG. 4 shows cross-sectional views of two parts of the semiconductor structure 100. As shown in FIG. 4, a first part 1001 of the semiconductor structure 100 is cut through the input/output circuits 152B and 150A, the computation circuit 120A and the memory circuit 130B along a cutting line parallel to a direction Y in FIG. 1, and a second part 1002 of the semiconductor structure 100 is cut through the input/output circuits 152A and 150B, the computation circuit 120B and the memory circuit 130A along a cutting line parallel to the direction Y in FIG. 1.

As shown in FIG. 4, the input/output circuit 152B may receive an external signal SIG1A from bumps BP under the die 110A through corresponding TSVs 118A and further transmit the processed external signal to the computation circuit 120A in the die 110A through the hybrid bonding between the dies 110A and 110B. In addition, the computation circuit 120A may transmit signals externally through the input/output circuit 152B and corresponding TSVs 118A.

Similarly, the input/output circuit 150B may receive an external signal SIG1B from the bumps BP under the die 110A through the TSVs 118A and further transmit the processed external signal to the computation circuit 120B in the die 110B. In addition, the computation circuit 120B may also transmit signals externally through the input/output circuit 150B and corresponding TSVs 118A.

In the present embodiment, since no TSVs are formed under MOSFETs of the input/output circuits 150B and 152B, analog signals received and transmitted by the input/output circuits 150B and 152B can receive less interference so as to preserve quality of signal transmission. Furthermore, since the input/output circuits 150A and 152A are dummy circuits, the TSVs 118A can be formed under the input/output circuits 150A and 152A without causing signal interference.

As shown in FIGS. 2 and 3, a physical interface circuit 160A and a physical interface circuit 162A may further be formed in the device layer 114A and the RDL 116A, and a physical interface circuit 160B and a physical interface circuit 162B may be formed in the device layer 114B and the RDL 116B. Each of the physical interface circuits 160A, 162A, 160B and 162B can be adopted as a PHY for the computation circuit 120A or 120B to access an external memory, such as a DRAM.

In the present embodiment, the computation circuit 120A can be coupled to one of the physical interface circuits 160A, 162A, 160B and 162B, and the computation circuit 120B can be coupled to another one of the physical interface circuits 160A, 162A, 160B and 162B. That is, only two of the physical interface circuits 160A, 162A, 160B and 162B are used by the corresponding computation circuits 120A and 120B respectively, while the remaining two of the physical interface circuits 160A, 162A, 160B and 162B can be dummy circuits and not be coupled to any computation circuit 120A or 120B.

Figure 5:
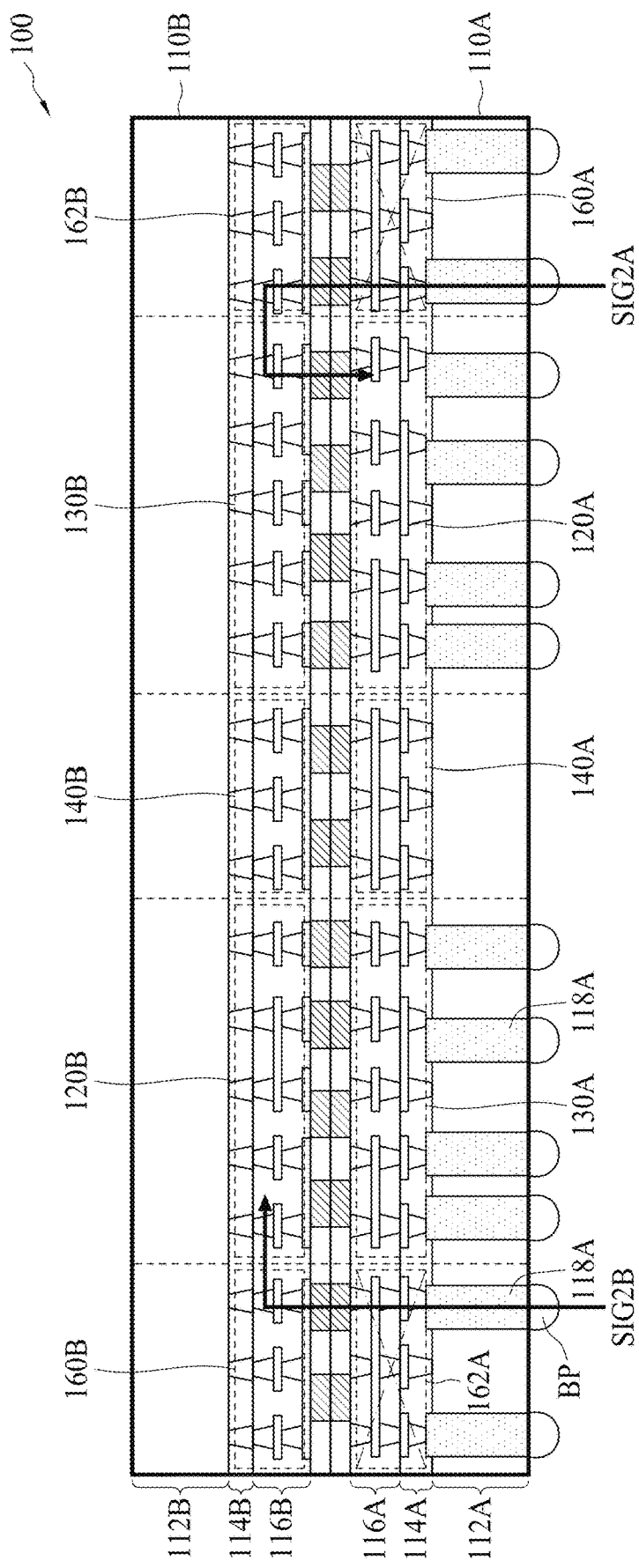
FIG. 5 shows a cross-sectional view of the semiconductor structure in FIG. 1.

For example, the computation circuit 120A can be coupled to the physical interface circuit 162B, and the computation circuit 120B can be coupled to the physical interface circuit 160B. FIG. 5 shows a cross-sectional view of the semiconductor structure 100. As shown in FIG. 5, the semiconductor structure 100 is cut along a cutting line parallel to a direction X in FIG. 1.

As shown in FIG. 5, the physical interface circuit 162B may receive a signal SIG2A of an external DRAM from the bumps BP under the die 110A through corresponding TSVs 118A and further transmit the processed external signal to the computation circuit 120A in the die 110A through the hybrid bonding between the dies 110A and 110B. In addition, the computation circuit 120A may transmit a signal to an external DRAM through the physical interface circuit 162B and corresponding TSVs 118A.

Similarly, the physical interface circuit 160B may receive an external signal SIG2B of the external DRAM from the bumps BP under the die 110A through corresponding TSVs 118A and transmit the signal SIG2B to the computation circuit 120B in the die 110B. In addition, the computation circuit 120B may transmit a signal to the external DRAM through the physical interface circuit 160B and corresponding TSVs 118A.

In the present embodiment, since no TSVs are formed under the MOSFETs of the physical interface circuits 160B and 162B, analog signals received and transmitted by the physical interface circuits 160B and 162B can be interfered with less. Furthermore, since the physical interface circuits 160A and 162A are dummy circuits, the TSVs 118A can be formed under the physical interface circuits 160A and 162A without causing signal interference.

In addition, as shown in FIG. 5, to reduce the interference of analog signals transmitted and received by the intra-stack connection circuits 140A and 140B, the TSVs 118A may be formed under the computation circuits 120A and the memory circuit 130A but may not be formed under the intra-stack connection circuit 140A.

Also, as shown in FIGS. 2 and 3, the floorplans of the input/output circuits 150A and 152A can be at peripheral regions RA4 and RA5 of the die 110A, and the floorplans of the input/output circuits 150B and 152B can be at peripheral regions RB4 and RB5 of the die 110B, thereby simplifying an external routing of the semiconductor structure 100. Similarly, the floorplans of the physical interface circuits 160A and 162A can be at peripheral regions RA6 and RA7 of the die 110A, and the floorplans of the physical interface circuits 160B and 162B can be at peripheral regions RB6 and RB7 of the die 110B. However, the floorplans of the input/output circuits 150A, 152A, 150B, and 152B and the floorplans of the physical interface circuits 160A, 162A, 160B, and 162B shown in FIGS. 2 and 3 are not to limit the present disclosure. In some other embodiments, the floorplans of the input/output circuits 150A, 152A, 150B, and 152B and the floorplans of the physical interface circuits 160A, 162A, 160B, and 162B may be arranged to peripheral regions of the dies 110A and 110B according to requirements.

In the semiconductor structure 100, the die 110A and the die 110B are stacked in a face-to-face manner; that is, the RDL 116B of the die 110B can face the RDL 116A of the die 110A. However, the present disclosure is not limited thereto. In some other embodiments, the die 110A and the die 110B can be stacked in a face-to-back manner.

Figure 6:
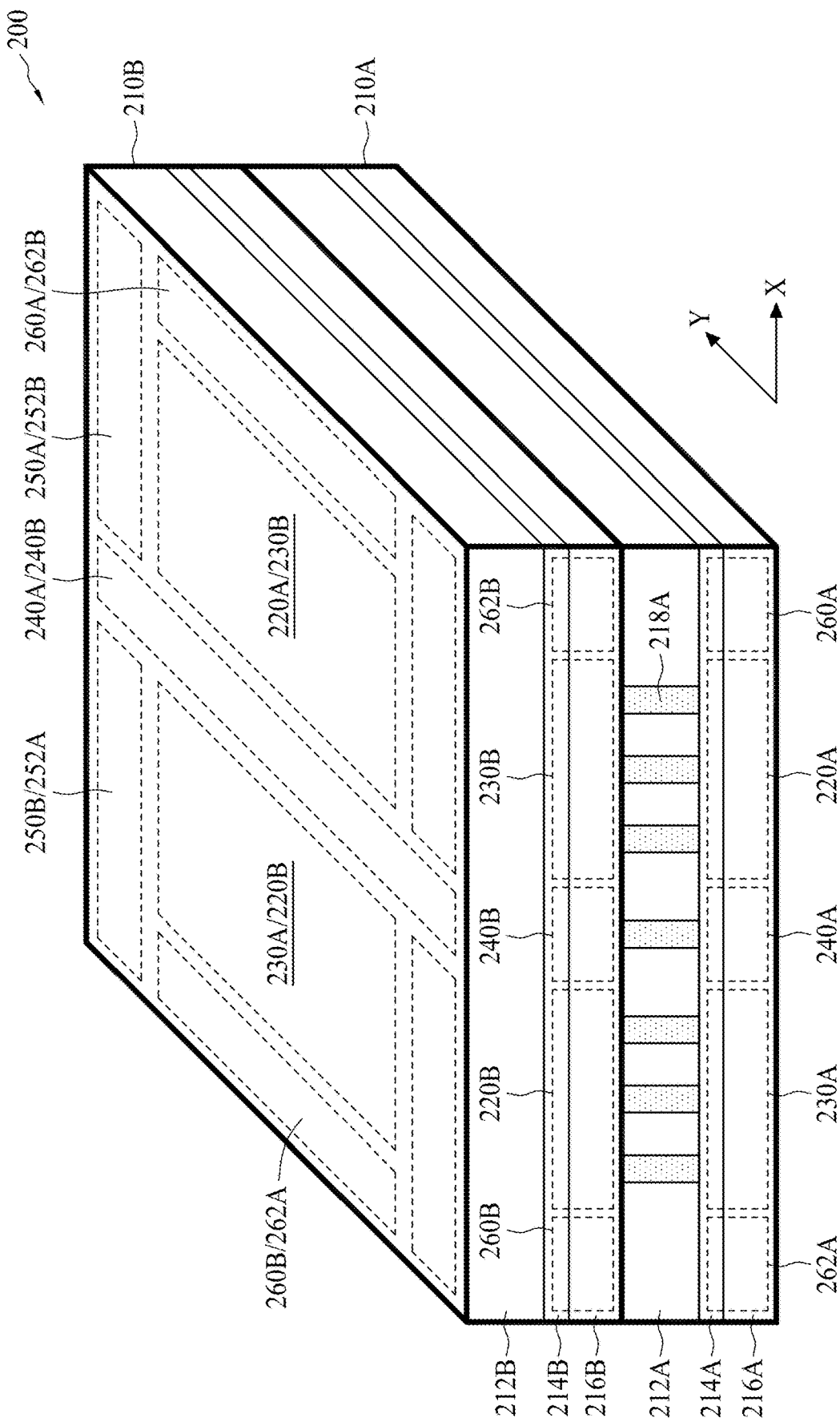
FIG. 6 shows a semiconductor structure according to another embodiment of the present disclosure.

FIG. 6 shows a semiconductor structure 200 according to another embodiment of the present disclosure. The semiconductor structure 200 and the semiconductor structure 100 can have similar structures and can be operated according to similar principles. For example, the semiconductor structure 200 can include dies 210A and 210B with the die 210B stacked on the die 210A. The die 210A includes a substrate 212A, a device layer 214A, an RDL 216A, and a plurality of TSVs 218A, and the die 210B includes a substrate 212B, a device layer 214B, and an RDL 216B.

Figure 7:
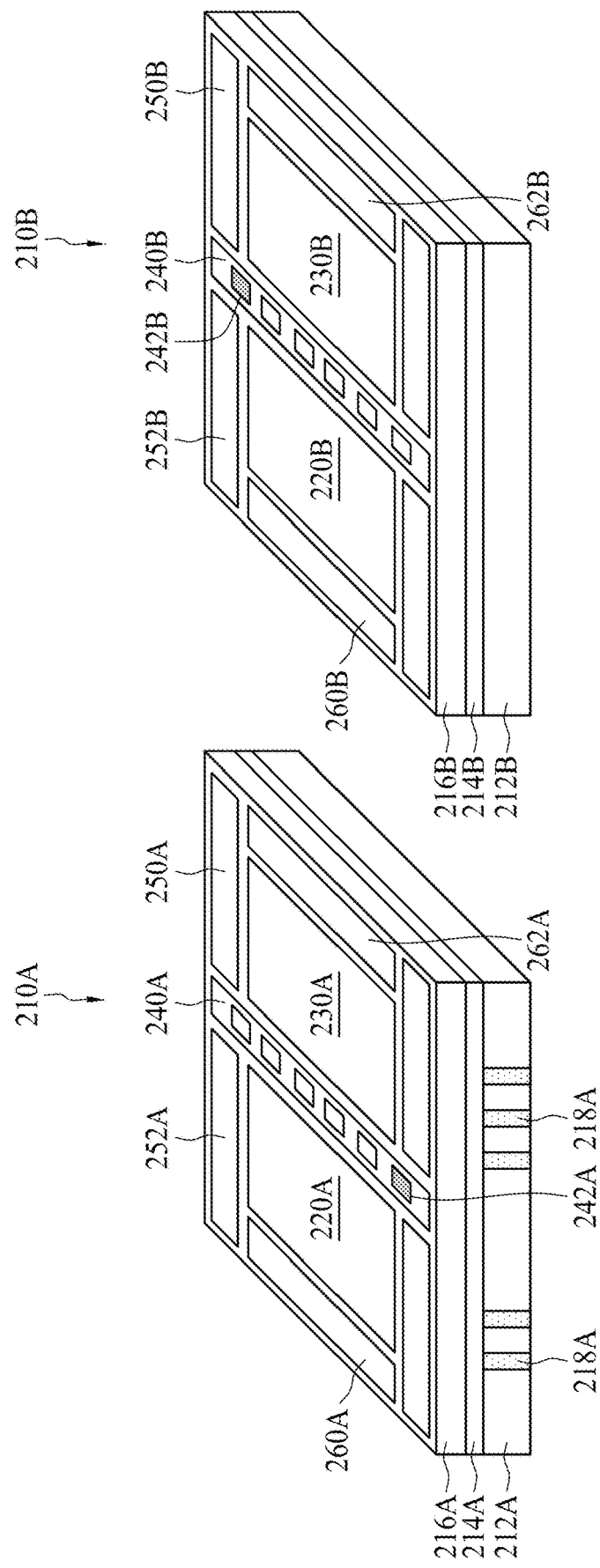
FIG. 7 shows a top view of dies of the semiconductor structure in FIG. 6 before the dies are stacked.
Figure 8:
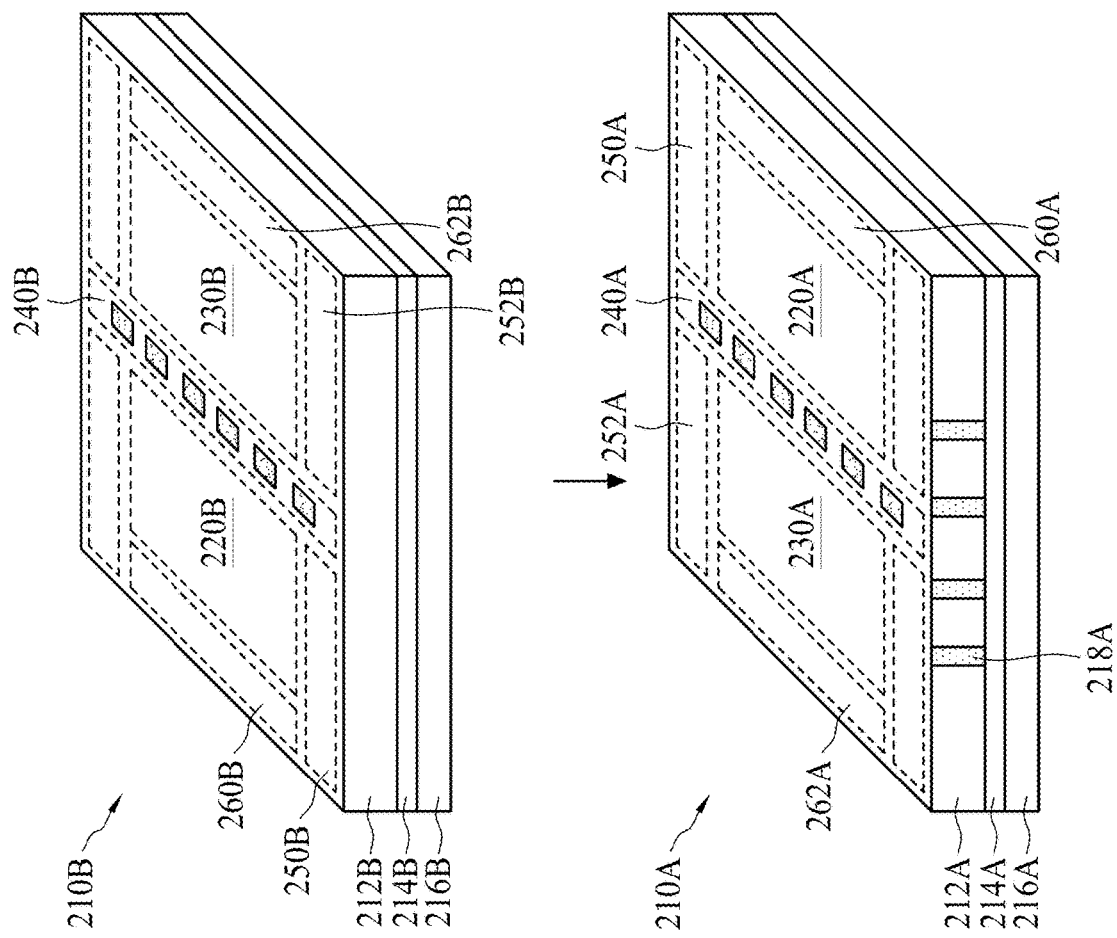
FIG. 8 shows an exploded top view of the semiconductor structure in FIG. 6.

FIG. 7 shows a top view of dies 210A and 210B with the RDLs 216A and 216B facing upward before the dies 210A and 210B are stacked, and FIG. 8 shows an exploded top view of the semiconductor structure 200. As shown in FIGS. 6 to 8, a computation circuit 220A, a memory circuit 230A, an intra-stack connection circuit 240A, two input/output circuits 250A and 252A, and two physical interface circuits 260A and 262A can be formed in the device layer 214A and the RDL 216A of the die 210A. Similarly, a computation circuit 220B, a memory circuit 230B, an intra-stack connection circuit 240B, two input/output circuits 250B and 252B, and two physical interface circuits 260B and 262B can be formed in the device layer 214B and the RDL 216B of the die 210B.

In the present embodiment, structures and floorplans of the computation circuit 220A, the memory circuit 230A, the intra-stack connection circuit 240A, the input/output circuits 250A and 252A, and the physical interface circuits 260A and 262A can be same as structures and floorplans of the computation circuit 220B, the memory circuit 230B, the intra-stack connection circuit 240B, the input/output circuits 250B and 252B, and the physical interface circuits 260B and 262B. In such case, the structures of the device layer 214A and the RDL 216A can be replicas of structures of the device layer 214B and the RDL 216B. That is, the device layer 214A and the RDL 216A can be manufactured using a set of masks same as that used for manufacturing the device layer 214B and the RDL 216B, thereby reducing a cost of creating different sets of masks.

However, a difference between the semiconductor 100 and the semiconductor 200 is that the die 210B is stacked on the die 210A in a face-to-back manner. That is, the RDL 216B of the die 210B can face the substrate 212A of the die 210A.

In the present embodiment, the die 210B shown in FIG. 7 can be rotated 180 degrees before being stacked on the back of the die 210A shown in FIG. 8. Therefore, as shown in FIG. 8, the floorplan of the computation circuit 220A may overlap the floorplan of the memory circuit 230B, and the floorplan of the computation circuit 220B may overlap the floorplan of the memory circuit 230A. However, since the intra-stack connection circuits 240A and 240B can be placed in middles of the die 210A and 210B, the intra-stack connection circuits 240A and 240B can still be aligned after the die 210B is rotated and stacked on the die 210A, as shown in FIG. 8.

Furthermore, in such case, since the second die 210B may be rotated 180 degrees before it is stacked on the die 210A, the pads 242A and 242B (indicated by shading in FIG. 7) will be coupled to each other, as shown in FIG. 8. In such case, the pads 242A of the intra-stack connection circuit 240A can be corresponding to a plurality of pairs of single-direction connection ports, and the pads 242B of the intra-stack connection circuit 240B can be corresponding to a plurality of pairs of single-direction connection ports, where each pair of single-direction connection ports can comprise a transmitting port and a receiving port.

That is, the transmitting ports and the receiving ports of the intra-stack connection circuits 240A and 240B can be designed separately, and when the die 210B is rotated and stacked on the die 210A, the receiving ports of the intra-stack connection circuit 240A will be coupled to the transmitting ports of the intra-stack connection circuit 240B, and the transmitting ports of the intra-stack connection circuit 240A will be coupled to the receiving ports of the intra-stack connection circuit 240B. However, the present disclosure is not limited thereto. In some embodiments, the pads 242A and 242B can also correspond to dual-direction connection ports, and can be programmed or controlled to perform desired functions so as to behave as receiving ports or transmitting ports.

Figure 9:
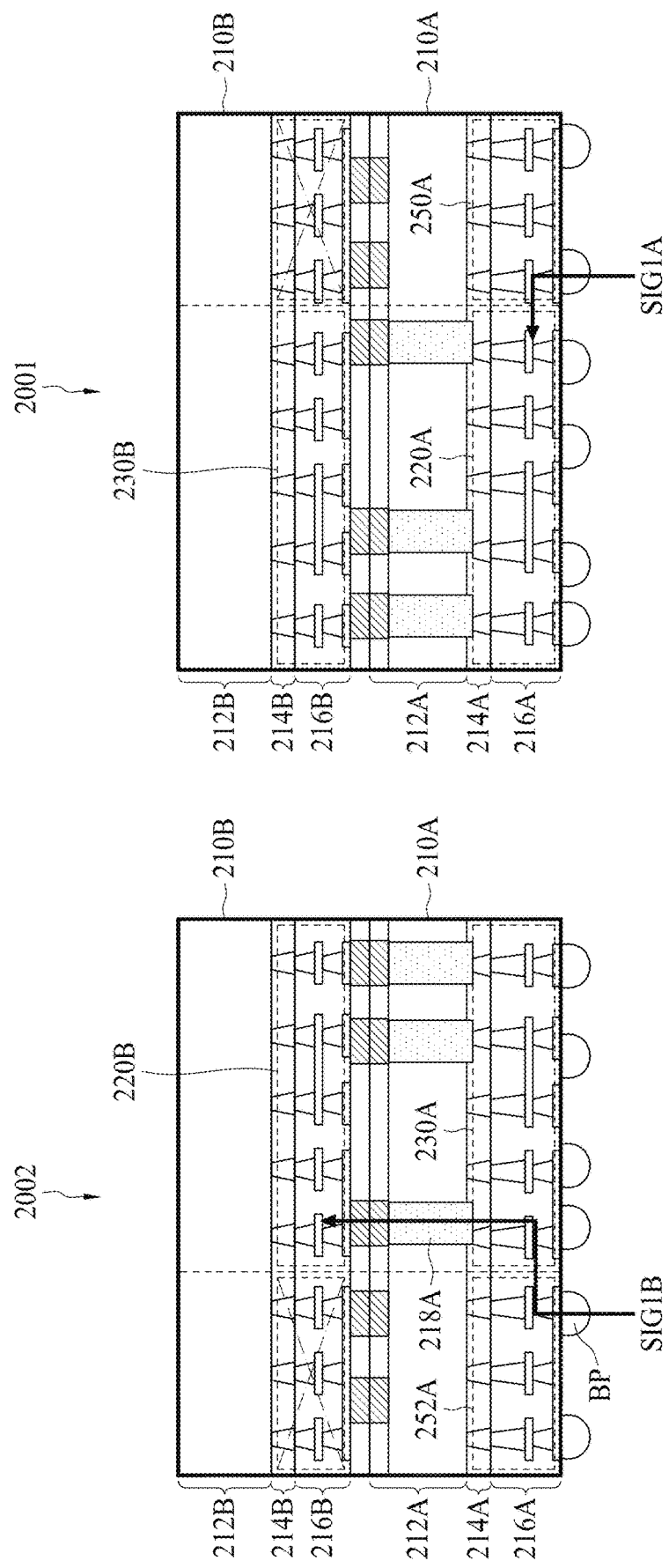
FIG. 9 shows cross-sectional views of two parts of the semiconductor structure in FIG. 6.

In addition, in the semiconductor structure 200, the computation circuit 220A can be coupled to the input/output circuit 250A and the physical interface circuit 260A, and the computation circuit 220B can be coupled to the input/output circuit 252A and the physical interface circuit 262A. In such case, the input/output circuits 250B and 252B and the physical interface circuits 260B and 262B can be dummy circuits. FIG. 9 shows cross-sectional views of two parts of the semiconductor structure 200, and FIG. 10 shows a cross-sectional view of the semiconductor structure 200.

As shown in FIG. 9, a first part 2001 of the semiconductor structure 200 is cut through the input/output circuit 250A, the computation circuit 220A and the memory circuit 230B along a cutting line parallel to the direction Y in FIG. 6, and a second part 2002 of the semiconductor structure 200 is cut through the input/output circuit 252A, the computation circuit 220B and the memory circuit 230A along a cutting line parallel to the direction Y in FIG. 6. As shown in FIG. 9, the input/output circuit 250A may receive an external signal SIG1A from bumps BP under the die 210A and further transmit the processed external signal to the computation circuit 220A in the die 210A. In addition, the computation circuit 220A may transmit signals externally through the input/output circuit 250A.

The input/output circuit 252A may receive an external signal SIG1B from the bumps BP under the die 210A and further transmit the processed external signal to the computation circuit 220B in the die 210B through corresponding TSVs 218A in the die 210A. In addition, the computation circuit 220B may transmit signals externally through the input/output circuit 252A.

Figure 10:
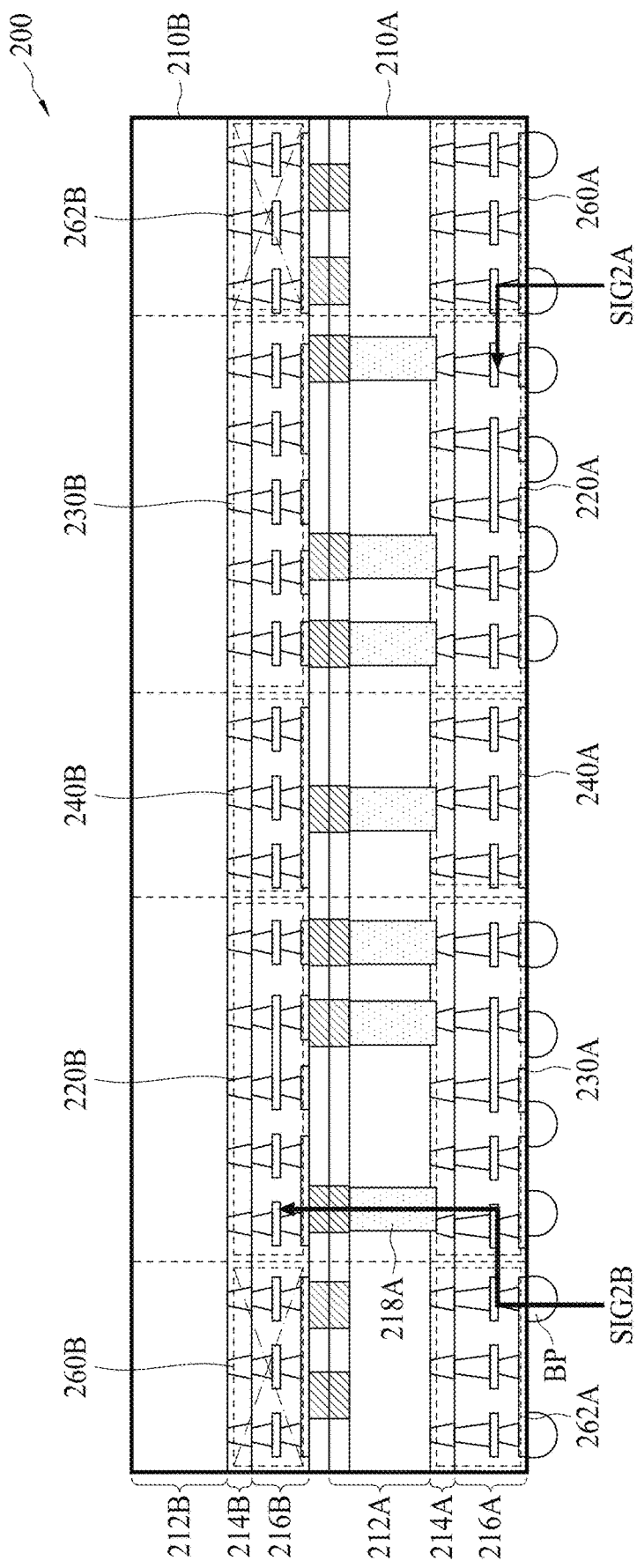
FIG. 10 shows a cross-sectional view of the semiconductor structure in FIG. 6.

Similarly, as shown in FIG. 10, the physical interface circuit 260A may receive an external signal SIG2A of a DRAM from the bumps BP under the die 210A and further transmit the processed external signal to the computation circuit 220A in the die 210A. In addition, the computation circuit 220A may transmit signals to the external DRAM through the physical interface circuit 260A.

The physical interface circuit 262A may receive an external signal SIG2B of a DRAM from the bumps BP under the die 210A and further transmit the processed external signal to the computation circuit 220B in the die 210B through corresponding TSVs 218A in the die 210A. In addition, the computation circuit 220B may transmit signals to the external DRAM through the physical interface circuit 262A.

In the present embodiments, to avoid interference of analog signals processed by the input/output circuits 250A and 252A and the physical interface circuits 260A and 262A, the floorplans of the TSVs 218A may not overlap floorplans of the input/output circuits 250A and 252A and the floorplans of the physical interface circuits 260A and 262A.

In the semiconductor structure 200, although the input/output circuits 250B and 252B and the physical interface circuits 260B and 262B in the die 210B can be dummy circuits, the present disclosure is not limited thereto. In some other embodiments, the computation circuits 220A and 220B may be coupled to any two of the input/output circuits 250A, 252A, 250B and 252B and any two of the physical interface circuits 260A, 262A, 260B and 262B.

Figure 11:
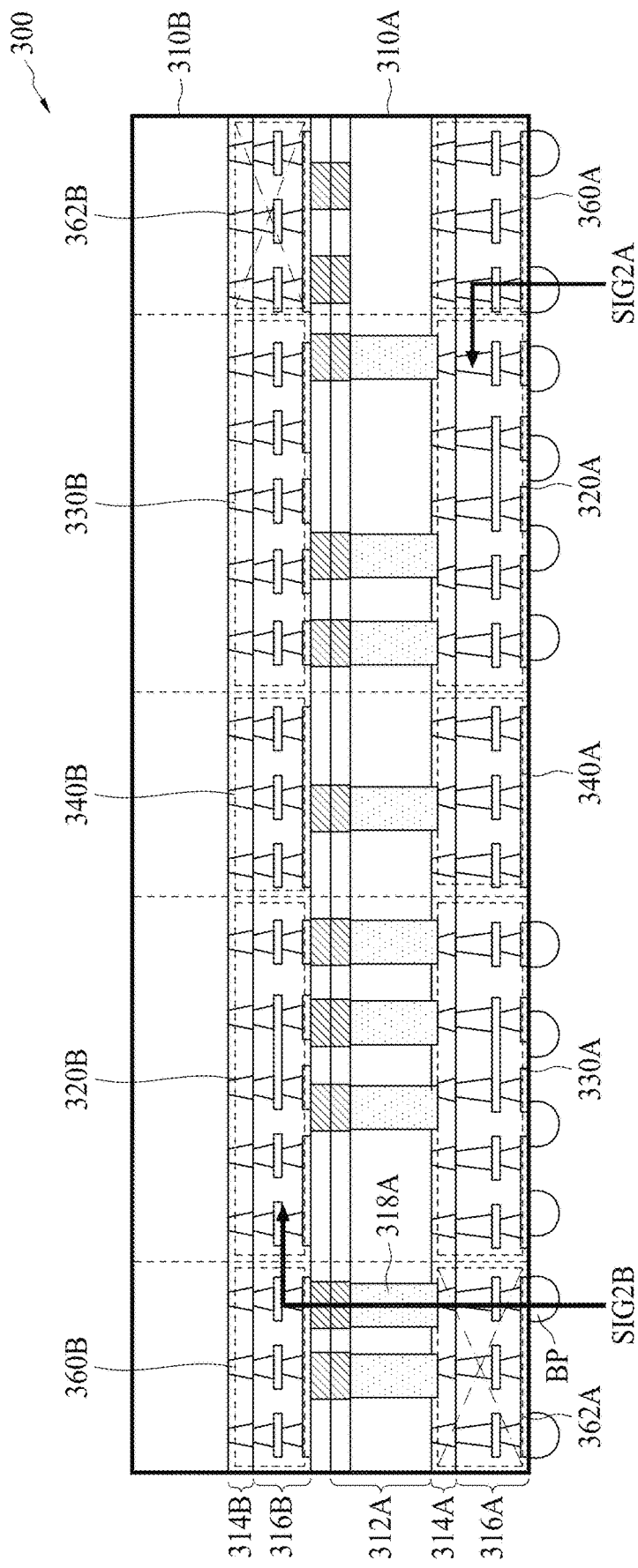
FIG. 11 shows a cross-sectional view of a semiconductor structure according to another embodiment of the present disclosure.
Figure 12:
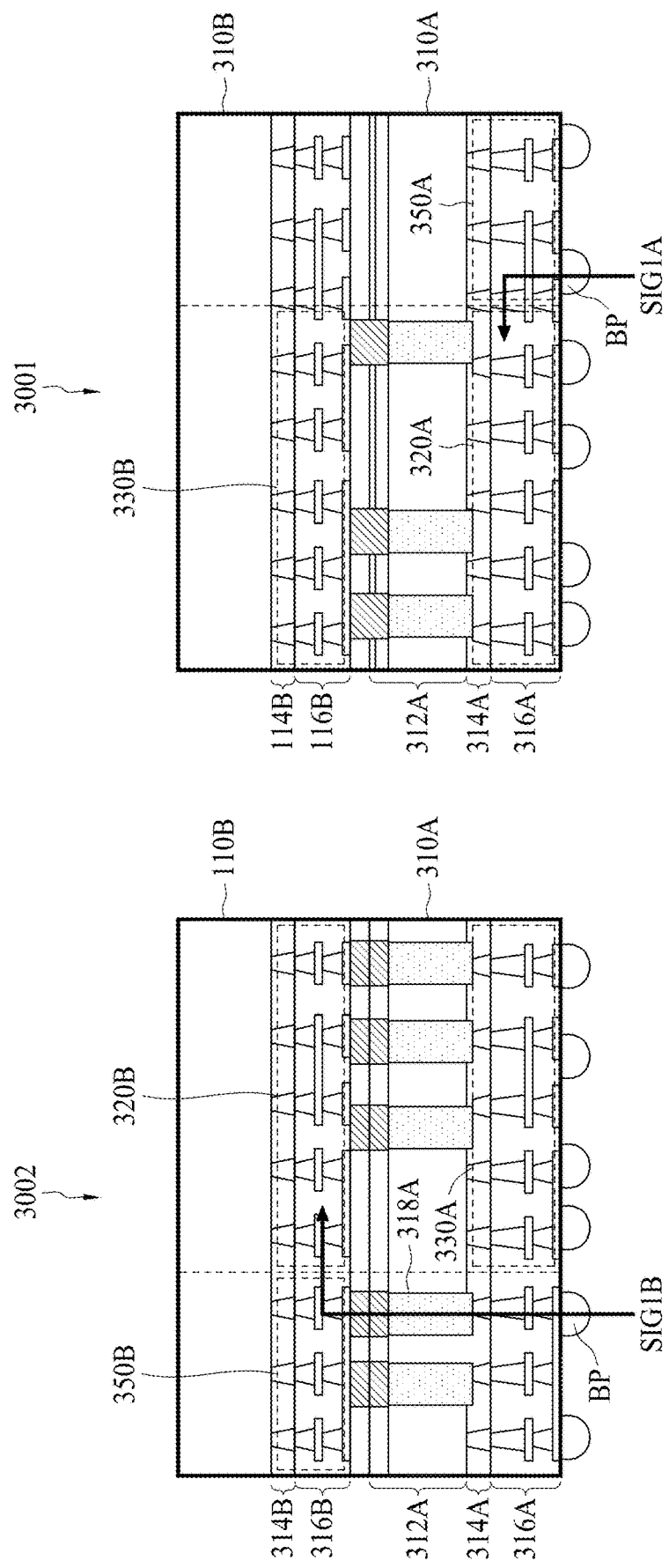
FIG. 12 shows cross-sectional views of two parts of the semiconductor structure in FIG. 11.

FIG. 11 shows a cross-sectional view of a semiconductor structure 300 according to another embodiment of the present disclosure, and FIG. 12 shows another two cross-sectional views of two parts of the semiconductor structure 300. The semiconductor structure 300 and the semiconductor 200 have similar structures and can be operated according to similar principles. For example, the semiconductor structure 300 may include dies 310A and 310B with circuits having floorplans same as the floorplans of the circuits in the dies 210A and 210B.

Structures of a computation circuit 320A, a memory circuit 330A, an intra-stack connection circuit 340A, input/output circuits 350A and 352A, and physical interface circuits 360A and 362A formed in a device layer 314A and an RDL 316A can be same as structures of a computation circuit 320B, a memory circuit 330B, an intra-stack connection circuit 340B, input/output circuits 350B and 352B, and physical interface circuits 360B and 362B formed in a device layer 314B and an RDL 316B. Therefore, the device layer 314A and the RDL 316A can be manufactured by a set of masks same as that used for manufacturing the device layer 314B and the RDL 316B.

However, unlike in the semiconductor structure 200, the computation circuit 320A formed in the die 310A can be coupled to the physical interface circuit 360A, while the computation circuit 320B formed in the die 310B can be coupled to the physical interface circuit 360B. That is, the physical interface circuit 362A near the memory circuit 330A can be a dummy circuit, and the physical interface circuit 362B near the memory circuit 330B can be a dummy circuit.

As shown in FIG. 11, the physical interface circuit 360A may receive an external signal SIG2A of a DRAM from the bumps BP under the die 310A and further transmit the processed external signal to the computation circuit 320A in the die 310A. In addition, the computation circuit 320A may transmit signals to the external DRAM through the physical interface circuit 360A.

The physical interface circuit 360B may receive an external signal SIG2B of a DRAM from the bumps BP under the die 310A through a corresponding TSV 318A and further transmit the processed external signal to the computation circuit 320B in the die 310B. In addition, the computation circuit 320B may transmit signals to the external DRAM through the physical interface circuit 360B. That is, while the computation circuits 220A and 220B may both be coupled to the physical interface circuits 260A and 262A in the die 210A as shown in FIG. 10, the computation circuit 320A may be coupled to the physical interface circuit 360A in the die 310A and the computation circuit 320B may be coupled to the physical interface circuit 360B in the die 310B, as shown in FIG. 11.

Furthermore, in the present embodiment shown in FIG. 11, to avoid interference of analog signals processed by the physical interface circuit 360A, floorplans of the TSVs 318A may not overlap floorplans of the physical interface circuit 360A. However, since the physical interface circuit 362A is a dummy circuit, the TSVs 318A may be formed under the physical interface circuit 362A in the substrate 312A.

As shown in FIG. 12, in the first part 3001 of the semiconductor structure 300, the input/output circuit 350A may receive an external signal SIG1A from the bumps BP under the die 310A, and may further transmit the processed external signal to the computation circuit 320A. In addition, the computation circuit 320A may transmit signals externally through the input/output circuit 350A.

In the second part 3002 of the semiconductor structure 300 shown in FIG. 12, the input/output circuit 350B may receive an external signal SIG1B from the bumps BP under the die 310A through corresponding TSVs 318A in the die 310A and further transmit the processed external signal to the computation circuit 320B in the die 310B. In addition, the computation circuit 320B may transmit signals externally through the input/output circuit 350B. That is, while the computation circuits 220A and 220B may both be coupled to the input/output circuits 250A and 252A in the die 210A as shown in FIG. 9, the computation circuit 320A may be coupled to the input/output circuit 350A in the die 310A and the computation circuit 320B may be coupled to the input/output circuit 350B in the die 310B, as shown in FIG. 12.

Figure 13:
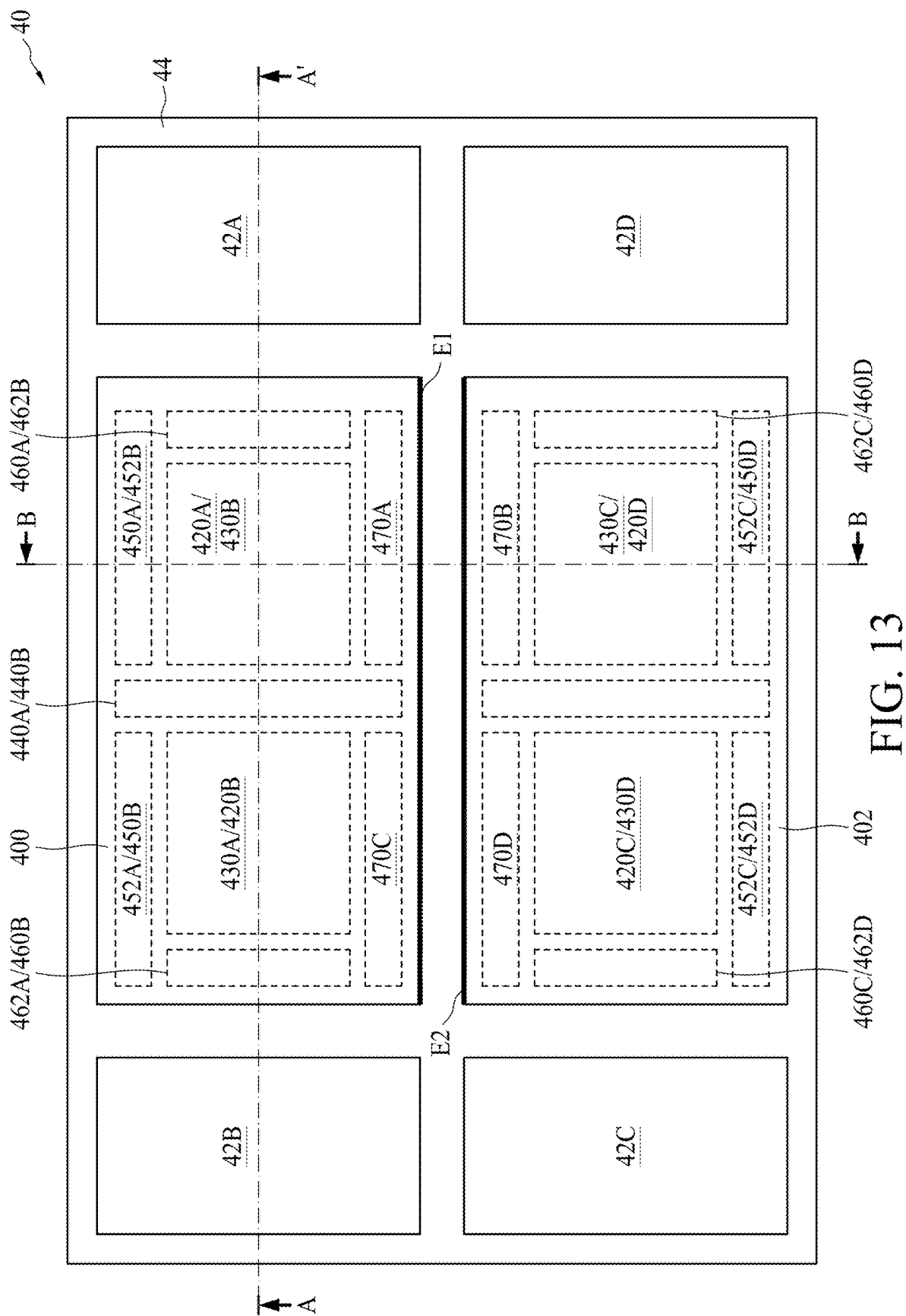
FIG. 13 shows a top view of a semiconductor device according to one embodiment of the present disclosure.

FIG. 13 shows a top view of a semiconductor device 40 according to one embodiment of the present disclosure. The semiconductor device 40 can include semiconductor structures 400 and 402, and the semiconductor structure 402 can be a replica of the semiconductor structure 400. As shown in FIG. 13, floorplans of circuits in the semiconductor structures 400 and 402 are indicated by dotted blocks. It should be noted that the floorplans of the circuits in the semiconductor structure 400 will be same as the floorplans of the circuits in the semiconductor structure 402 if the semiconductor structure 402 is rotated 180 degrees.

In the present embodiment, aspects of the semiconductor structures 400 and 402 can be same as aspects of the semiconductor structure 100, 200 or 300. For example, each of the semiconductor structures 400 and 402 may include two stacked dies, and each of the dies may include a computation circuit; therefore, the semiconductor device 40 may include a total of four computation circuits.

In the present embodiment, the semiconductor device 40 can further include at least one DRAM 42A coupled to a computation circuit 420A in the semiconductor structure 400. That is, the computation circuit 420A may not only access a memory circuit 430B with a higher speed inside the semiconductor structure 400 through intra-stack connection circuits 440A and 440B, but may also access the DRAM 42A having a greater capacity outside of the semiconductor structure 400. Similarly, the semiconductor device 40 may further include at least one DRAM 42B coupled to a computation circuit 420B in the semiconductor structure 400. In addition, the semiconductor device 40 may include at least one DRAM 42C and at least one DRAM 42D coupled to two computation circuits 420C and 420D in the semiconductor structure 402. That is, the computation circuit 420B can access both a memory circuit 430A and the DRAM 42B, the computation circuit 420C can access both a memory circuit 430D and the DRAM 42C, and the computation circuit 420D can access both a memory circuit 430C and the DRAM 42D.

Figure 14:
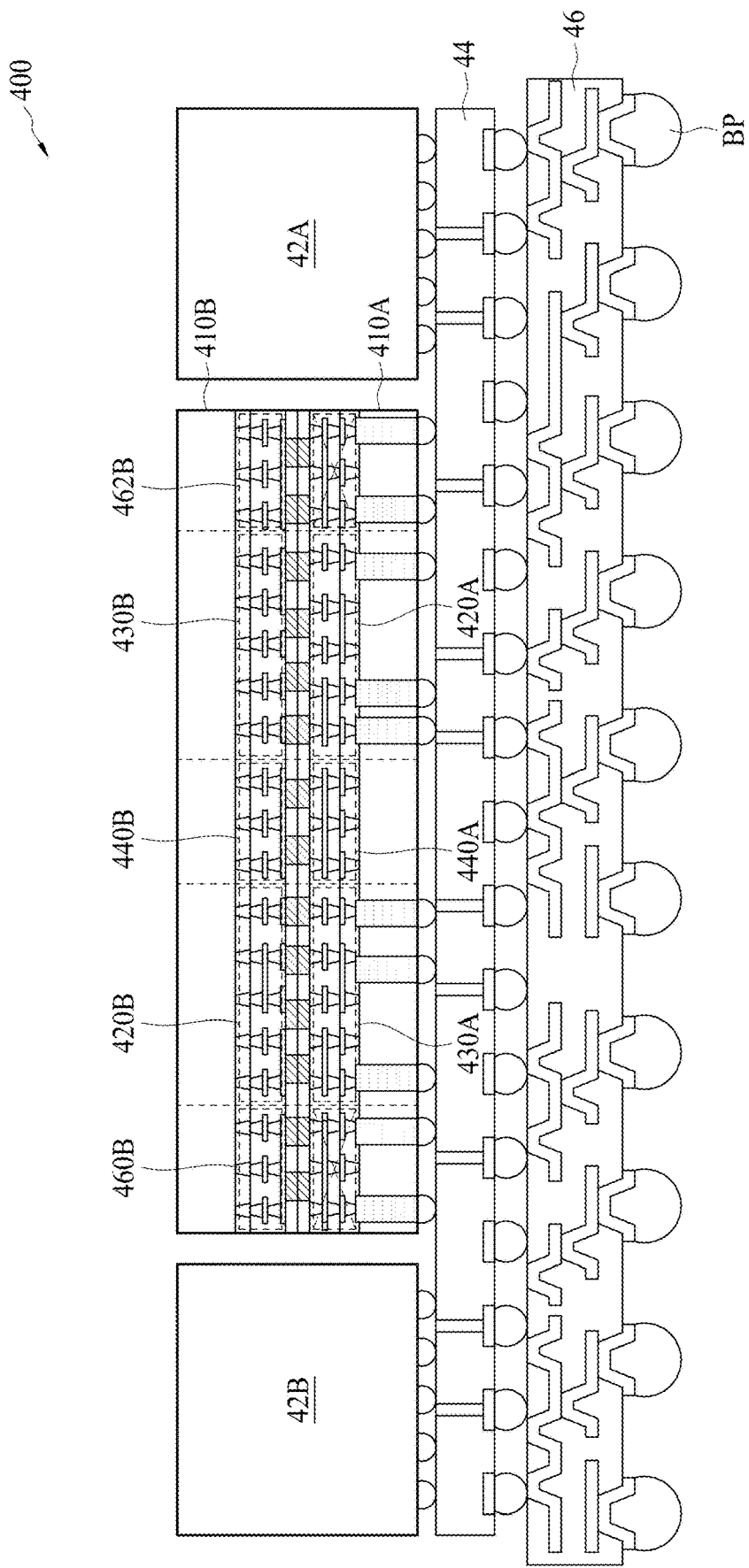
FIG. 14 shows a cross-sectional view of the semiconductor device in FIG. 13.

In the present embodiment, the semiconductor device 40 further includes an interposer 44. In such case, the semiconductor structures 400 and 402 and the DRAMs 42A, 42B, 42C and 42D can be disposed on the interposer 44. FIG. 14 shows a cross-sectional view of the semiconductor device 40 along a cutting line A-A' shown in FIG. 13. In the present embodiment, the die 410B can be stacked on the die 410A in a face-to-face manner similar to that of the dies 110A and 110B shown in FIG. 5. However, the present disclosure is not limited thereto. In some other embodiments, the die 410B may be stacked on the die 410A in a face-to-back manner as shown in FIGS. 10 and 11.

As shown in FIG. 14, the DRAM 42A can be coupled to the computation circuit 420A in the die 410 through a physical interface circuit 462B and the interposer 44. Similarly, the DRAM 42B can be coupled to the computation circuit 420B in the die 410 through a physical interface circuit 460B and the interposer 44. In the present embodiment, the DRAMs 42A, 42B, 42C and 42D can be high-bandwidth memories (HBMs) so that the computation circuits in the two semiconductor structures 400 and 402 may access the DRAMs 42A, 42B, 42C and 42D with greater bandwidths.

Furthermore, as shown in FIG. 14, the interposer 44 can further be disposed on a supporting substrate 46 with solder balls SB, that is, the semiconductor device 40 can be packaged as a four-core chiplet with DRAMs inside.

In addition, to simplify routing between the semiconductor devices and the DRAMs, floorplans of the physical interface circuits 460A and 462A and floorplans of physical interface circuits 460B, 462B, 460C, 462C, 460D and 462D can be placed at peripheral regions of the semiconductor structures 400 and 402 that are near the DRAMs 42A, 42B, 42C and 42D as shown in FIG. 13.

In the present embodiment, the semiconductor structure 400 may further include an inter-stack connection circuit 470A, and the semiconductor structure 402 may further include an inter-stack connection circuit 470B. By adopting the inter-stack connection circuits 470A and 470B, computation circuits in the semiconductor structures 400 and 402 can be coupled for data sharing.

Figure 15:
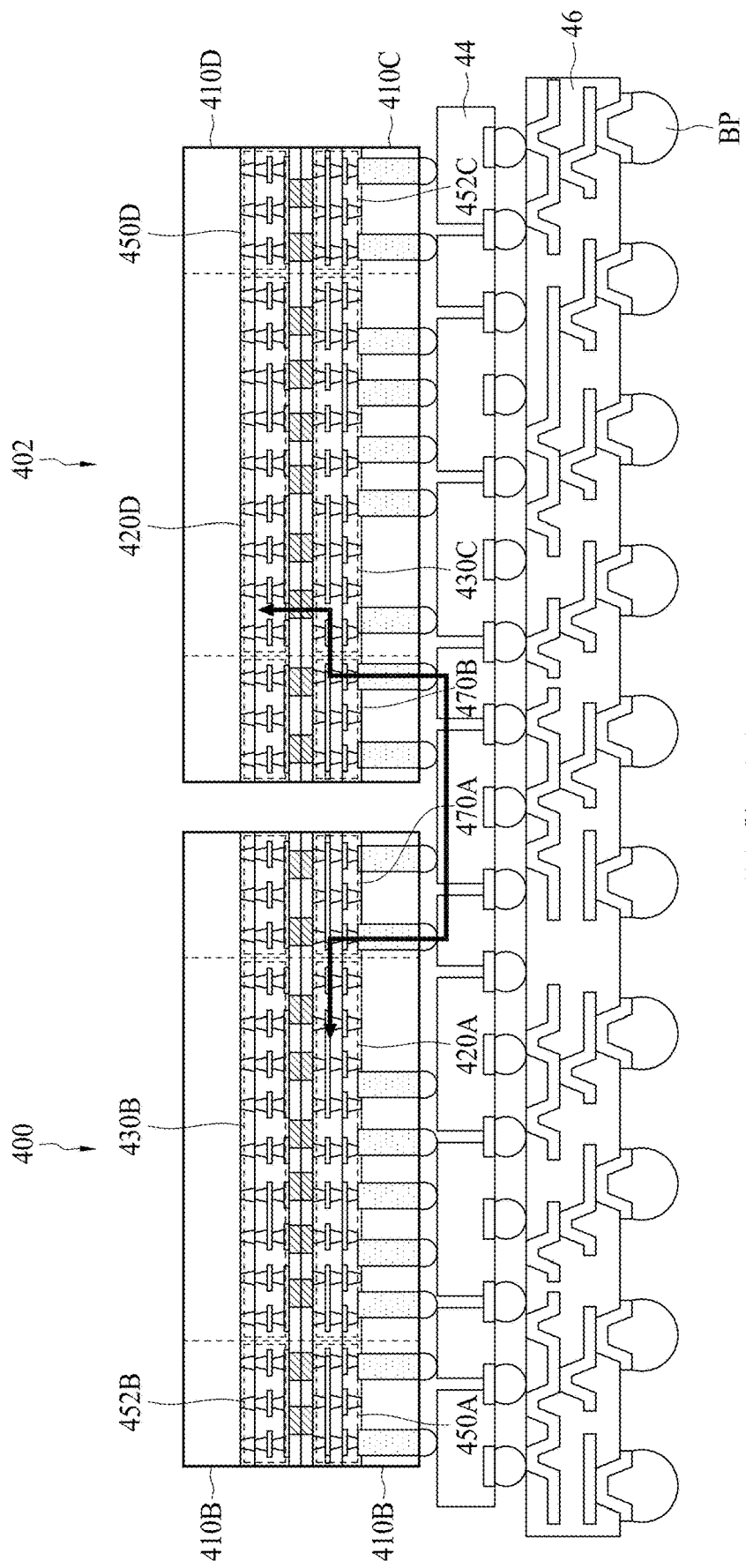
FIG. 15 shows another cross-sectional view of the semiconductor device in FIG. 13.

FIG. 15 shows another cross-sectional view of the semiconductor device 40 along a cutting line B-B' shown in FIG. 13. As shown in FIG. 15, the inter-stack connection circuit 470A can be coupled to the computation circuit 420A in the semiconductor structure 400, the inter-stack connection circuit 470B can be coupled to the computation circuit 420D in the semiconductor structure 402, and the inter-stack connection circuit 470A can be coupled to the inter-stack connection circuit 470B through the interposer 44. Therefore, the computation circuit 420A in the semiconductor structure 400 can communicate with the computation circuit 420D in the semiconductor structure 402 directly.

In such case, the semiconductor device 40 not only allows computation circuits in a same semiconductor structure to communicate with each other through the intra-stack connection circuits, but also allows computation circuits in different semiconductor structures to communicate with each other through the inter-stack connection circuits. As a result, the semiconductor device 40 can provide great flexibility for data sharing among cores and improve computation performance significantly. In some embodiments, the semiconductor structure 400 may further include an inter-stack connection circuit 470C, and the semiconductor structure 402 may further include an inter-stack connection circuit 470D. The inter-stack connection circuit 470C can be coupled to the inter-stack connection circuit 470D through the interposer 44, thereby allowing the computation circuit 420B to communicate with the computation circuit 420C directly. However, the present disclosure is not limited thereto. In some embodiments, the inter-stack connection circuits 470C and 470D may be omitted.

Furthermore, to simplify routing between the inter-stack connection circuit 470A and the inter-stack connection circuit 470B, the inter-stack connection circuit 470A can be placed near the inter-stack connection circuit 470B in the semiconductor device 40. For example, as shown in FIG. 13, floorplans of the inter-stack connection circuits 470A and 470C can be close to an edge E1 of the semiconductor structure 400, and floorplans of the inter-stack connection circuits 470B and 470D can be close to an edge E2 of the semiconductor structure 402. In such case, the semiconductor structure 400 and the semiconductor structure 402 are disposed side-by-side on the interposer 44 with the edge E1 and the edge E2 near to and parallel with each other.

In addition, to simplify the routing between input/output circuits 450A, 452A, 450B, 452B, 450C, 452C, 450D and 452D and external devices, the input/output circuits 450A, 452A, 450B, 452B, 450C, 452C, 450D and 452D are placed close to edges that are not near any DRAMs or semiconductor structures.

Although the semiconductor device 40 includes two semiconductor structures 400 and 402, the present disclosure is not limited thereto. In some other embodiments, the semiconductor device may include more semiconductor structures so as to include more cores in the chiplet.

Figure 16:
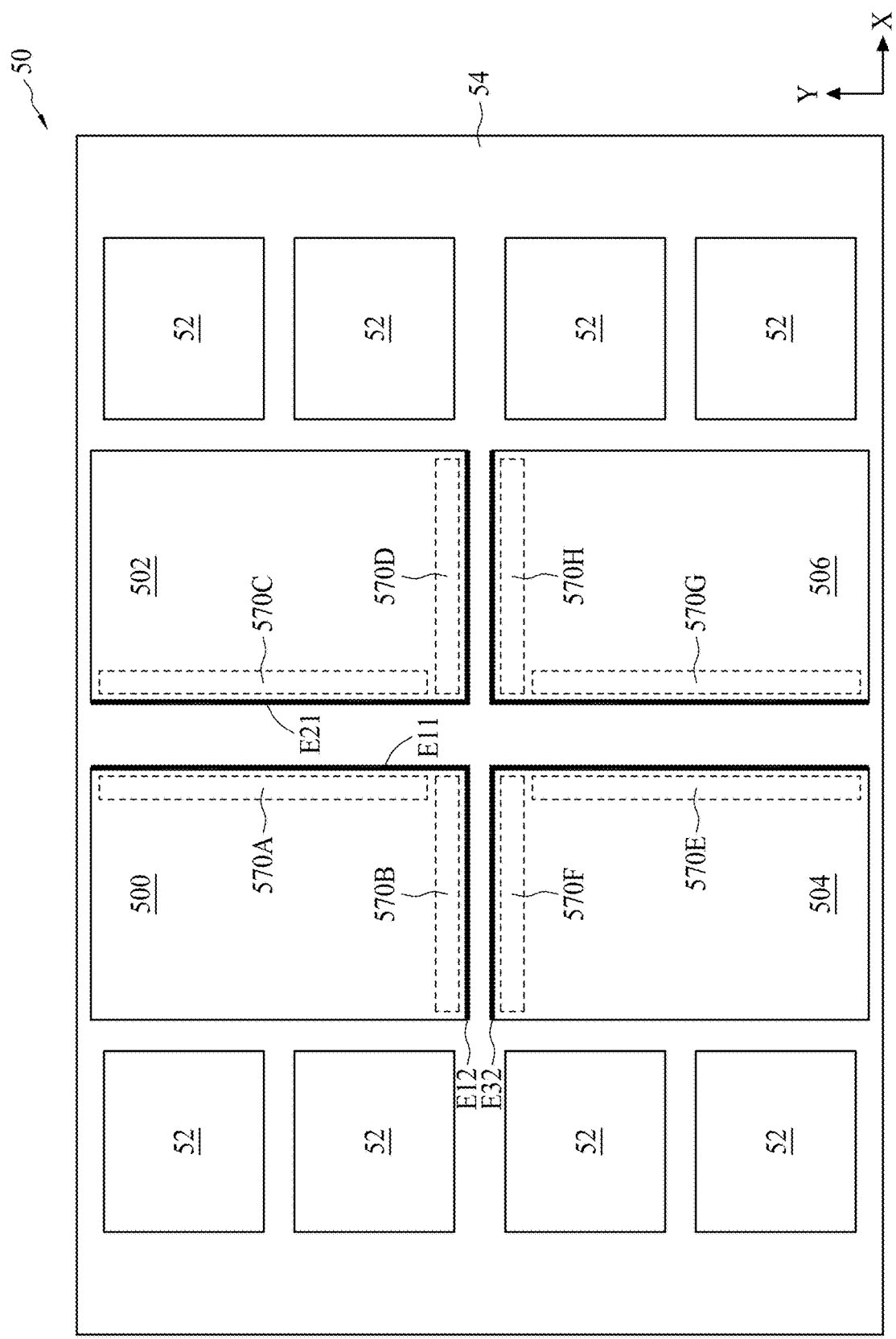
FIG. 16 shows a semiconductor device according to another embodiment of the present disclosure.

FIG. 16 shows a semiconductor device 50 according to another embodiment of the present disclosure. The semiconductor device 50 can include semiconductor structures 500, 502, 504 and 506, DRAMs 52, and an interposer 54, wherein the semiconductor structures 500, 502, 504 and 506, and the DRAMs 52 can be disposed on the interposer 54. Similar to the semiconductor structures 100, 200 and 300, each of the semiconductor structures 500, 502, 504 and 506 can include two stacked dies, and thus have two computation circuits. In such case, the semiconductor device 50 can have a total of eight computation circuits, that is, eight cores. In addition, each of the eight computation circuits can be coupled to at least one DRAM 52 through the interposer 54 in the present embodiment.

As shown in FIG. 16, the semiconductor structure 500 is near the semiconductor structure 502 along a first direction X, and the semiconductor structure 500 is near the semiconductor structure 504 along a second direction Y different from the first direction X. The semiconductor structure 504 is near the semiconductor structure 506 along the first direction X, and the semiconductor structure 502 is near the semiconductor structure 506 along the second direction Y.

Furthermore, to improve computation performance, the semiconductor device 50 allows computation circuits in different dies to communicate with each other through inter-stack connection circuits. For example, as shown in FIG. 16, the semiconductor structure 500 can include inter-stack connection circuits 570A and 570B, the semiconductor structure 502 can include inter-stack connection circuits 570C and 570D, the semiconductor structure 504 can include inter-stack connection circuits 570E and 570F, and the semiconductor structure 506 can include inter-stack connection circuits 570G and 570H. In the present embodiment, an inter-stack connection circuit in one of the semiconductor structures 500, 502, 504 or 506 can be coupled to an inter-stack connection circuit in another semiconductor structure. For example, the inter-stack connection circuit 570A of the semiconductor structure 500 can be coupled to the inter-stack connection circuit 570C of the semiconductor structure 502 through the interposer 54, and the inter-stack connection circuit 570B of the semiconductor structure 500 can be coupled to the inter-stack connection circuit 570F of the semiconductor structure 504 through the interposer 54.

As a result, a computation circuit in the semiconductor structure 500 can be coupled to a computation circuit in the semiconductor structure 502 through the inter-stack connection circuits 570A and 570C, and a computation circuit in the semiconductor structure 500 can be coupled to a computation circuit in the semiconductor structure 504 through the inter-stack connection circuits 570B and 570F. Since computation circuits in the same die can still be coupled to each other through intra-stack connection circuits as described in the previous embodiments, the semiconductor device 50 allows all computation circuits to share data directly or indirectly with each other, thereby providing greater flexibility for hardware arrangement and improving the computation performance.

To simplify routing between corresponding inter-stack connection circuits, floorplans of the inter-stack connection circuits can be arranged close to a center of the semiconductor device 50. For example, as shown in FIG. 16, a floorplan of the inter-stack connection circuit 570A can be close to an edge E11 of the semiconductor structure 500, a floorplan of the inter-stack connection circuit 570C can be close to an edge E21 of the semiconductor structure 502, and the semiconductor structure 500 and the semiconductor structure 502 can be disposed on the interposer 54 with the edge E11 and the edge E21 near to and parallel with each other.

In addition, a floorplan of the inter-stack connection circuit 570B can be close to an edge E12 of the semiconductor structure 500, a floorplan of the inter-stack connection circuit 570F can be close to an edge E32 of the semiconductor structure 504, and the semiconductor structure 500 and the semiconductor structure 504 can be disposed on the interposer 54 with the edge E12 and the edge E32 near to and parallel with each other. It should be noted that floorplans of other circuits in the semiconductor structures 500, 502, 504 and 506 are not shown in FIG. 16 for brevity.

In some embodiments, each of the inter-stack connection circuits 570A, 570B, 570C, 570D, 570E, 570F, 570G and 570H can be formed in a device layer and an RDL in either one of the two dies of the corresponding semiconductor structures 500, 502, 504 and 506. In the present embodiment, to allow the device layers and the RDLs in the dies to be manufactured using a same set of masks, each of the dies may include two inter-stack connection circuits; however, some of the inter-stack connection circuits can be dummy circuits and may not be coupled to any computation circuits.

Figure 17:
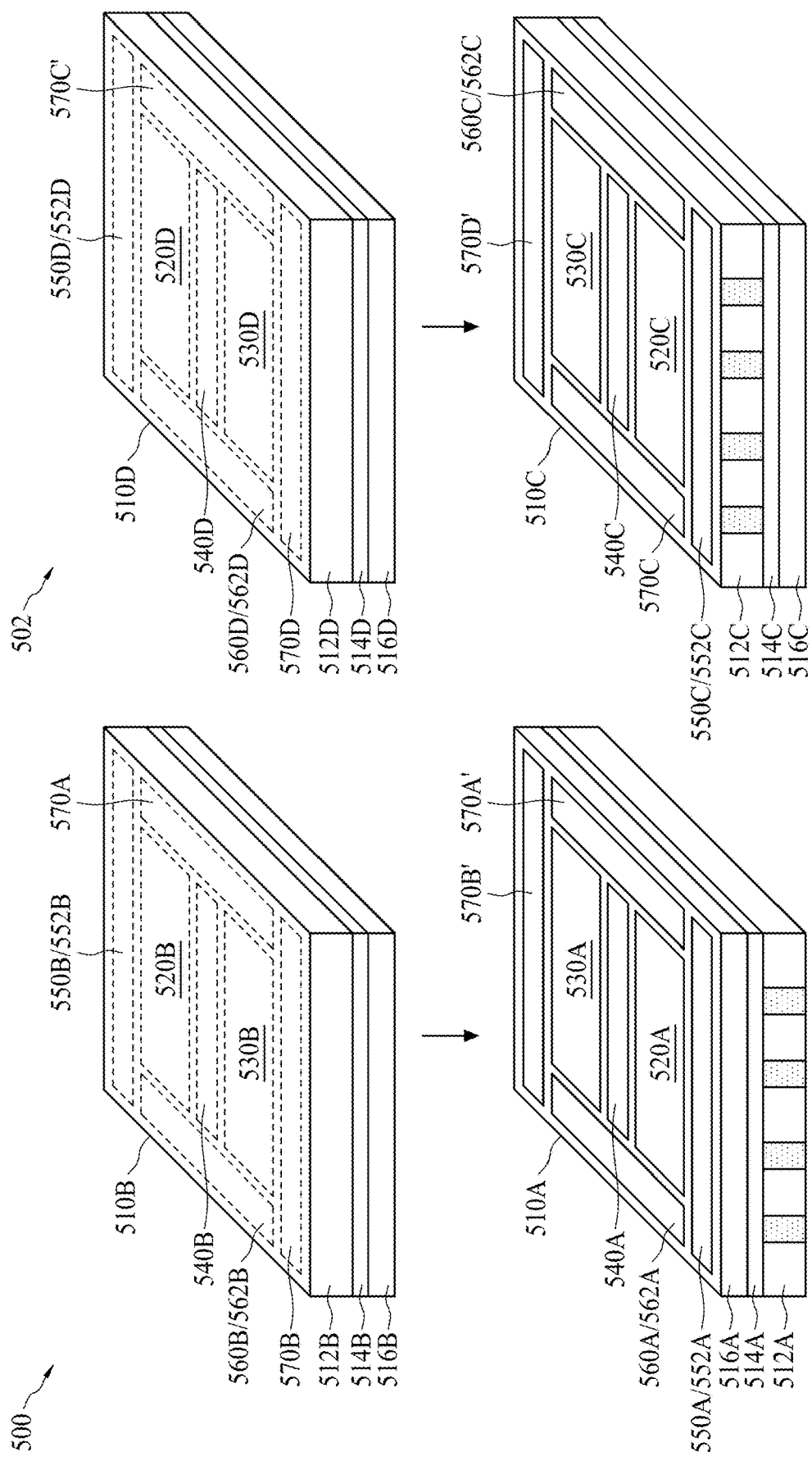
FIG. 17 shows an exploded top view of the semiconductor device in FIG. 16.

FIG. 17 shows an exploded top view of the semiconductor structures 500 and 502. As shown in FIG. 17, the semiconductor structure 500 includes a die 510A having a computation circuit 520A, a memory circuit 530A, an intra-stack connection circuit 540A, input/output circuits 550A and 552A, and physical interface circuits 560A and 562A formed in a device layer 514A and an RDL 516A on a substrate 512A, and includes a die 510B having a computation circuit 520B, a memory circuit 530B, an intra-stack connection circuit 540B, input/output circuits 550B and 552B, and physical interface circuits 560B and 562B formed in a device layer 514B and an RDL 516B on a substrate 512B.

Similarly, the semiconductor structure 502 includes a die 510C having a computation circuit 520C, a memory circuit 530C, an intra-stack connection circuit 540C, input/output circuits 550C and 552C, and physical interface circuits 560C and 562C formed in a device layer 514C and an RDL 516C on a substrate 512C, and includes a die 510D having a computation circuit 520D, a memory circuit 530D, an intra-stack connection circuit 540D, input/output circuits 550D and 552D, and physical interface circuits 560D and 562D formed in a device layer 514D and an RDL 516D on a substrate 512D.

In the present embodiment, the input/output circuits 550A and 552A and the physical interface circuits 560A and 562A in the die 510A can be dummy circuits, and the input/output circuits 550C and 552C and the physical interface circuits 560C and 562C in the die 510C can be dummy circuits. Similarly, the inter-stack connection circuits 570A and 570B can be formed in the die 510B, and the inter-stack connection circuits 570A' and 570B' formed in the die 510A can be dummy circuits. In addition, the inter-stack connection circuit 570C can be formed in the die 510C, the inter-stack connection circuit 570D can be formed in the die 510D, and the inter-stack connection circuit 570C' formed in the die 510C and the inter-stack connection circuit 570D' formed in the die 510D can be dummy circuits.

In such case, structures of the device layer 514B and the RDL 516B in the die 510B, structures of the device layer 514C and the RDL 516C in the die 510C, and structures of device the layer 514D and the RDL 516D in the die 510D can be replicas of structures of the device layer 514A and the RDL 516A in the die 510A. That is, the device layer 514A and the RDL 516A in the die 510A, the device layer 514B and the RDL 516B in the die 510B, the device layer 514C and the RDL 516C in the die 510C, and the device layer 514D and the RDL 516D in the die 510D can all be manufactured using a same set of masks, thereby reducing costs of creating different sets of masks.

In the present embodiments, the RDL 516B of the die 510B can face the RDL 516A of the die 510A, so the dies 510A and 510B in the semiconductor structure 500 can be stacked in a face-to-face manner. In addition, the RDL 516D of the die 510D can face the substrate 512C of the die 510C, so the dies 510C and 510D in the semiconductor structure 502 can be stacked in a face-to-back manner. As a result, the inter-stack connection circuits 570A can be near the inter-stack connection circuits 570C while the floorplans of the circuits in the dies 510A, 510B, 510C and 510D can all be same, so as to use a same set of masks.

In addition, in the present embodiment, the semiconductor 506 can be a replica of the semiconductor 500; however, the semiconductor structure 506 can be disposed on the interposer 54 with the intra-stack connection circuit 570H near the intra-stack connection circuit 570D of the semiconductor structure 502. Similarly, the semiconductor 504 can be a replica of the semiconductor 502; however, the semiconductor structure 504 can be disposed on the interposer 54 with the intra-stack connection circuit 570F near the intra-stack connection circuit 570B of the semiconductor structure 500 and the intra-stack connection circuit 570E near the intra-stack connection circuit 570G of the semiconductor structure 506.

Figure 18:
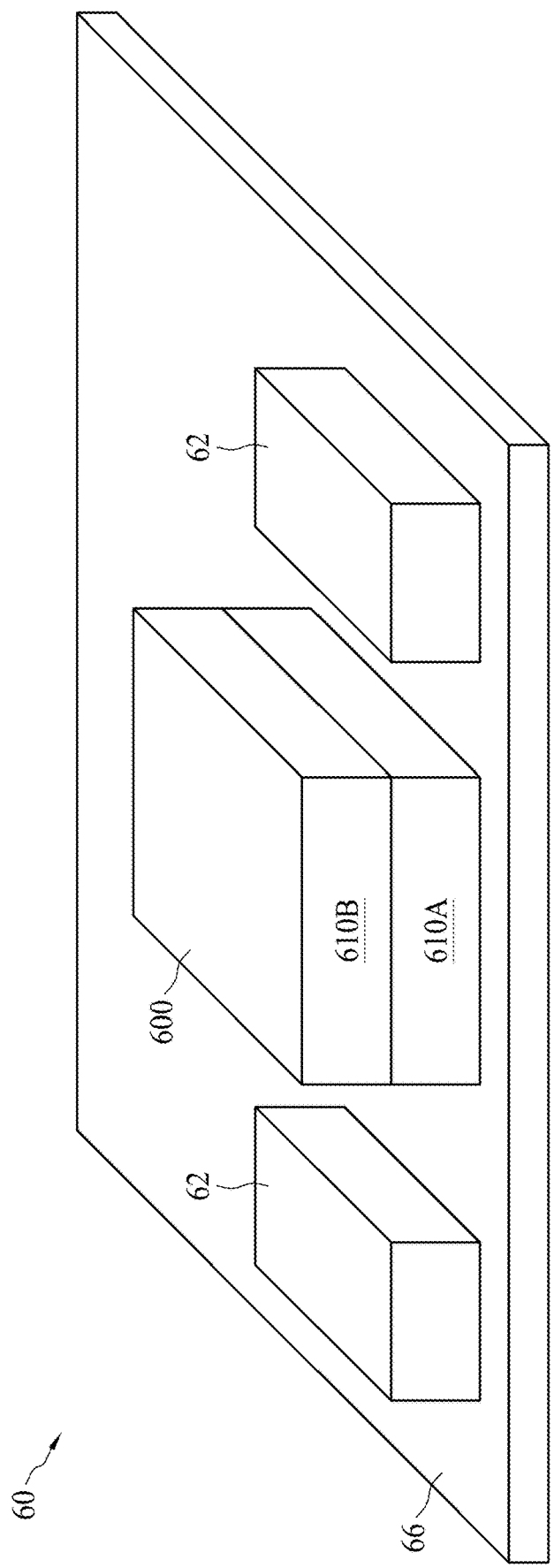
FIG. 18 shows a semiconductor device according to another embodiment of the present disclosure.

In addition, although the semiconductor devices 400 and 500 can be packaged as one chiplet, the present disclosure is not limited thereto. In some other embodiments, semiconductor structures and DRAMs may be packaged in different chips. FIG. 18 shows a semiconductor device 60 according to another embodiment of the present disclosure. The semiconductor device 60 includes a semiconductor structure 600, DRAMs 62, and a circuit board 66. The semiconductor structure 600 can be same as the semiconductor structure 100, 200, or 300. In addition, the DRAMs 62 can be double-data-rate synchronous dynamic random-access memory (SDRAM) and can be coupled to computation circuits in dies 610A and 610B of the semiconductor structure 600.

Figure 19:
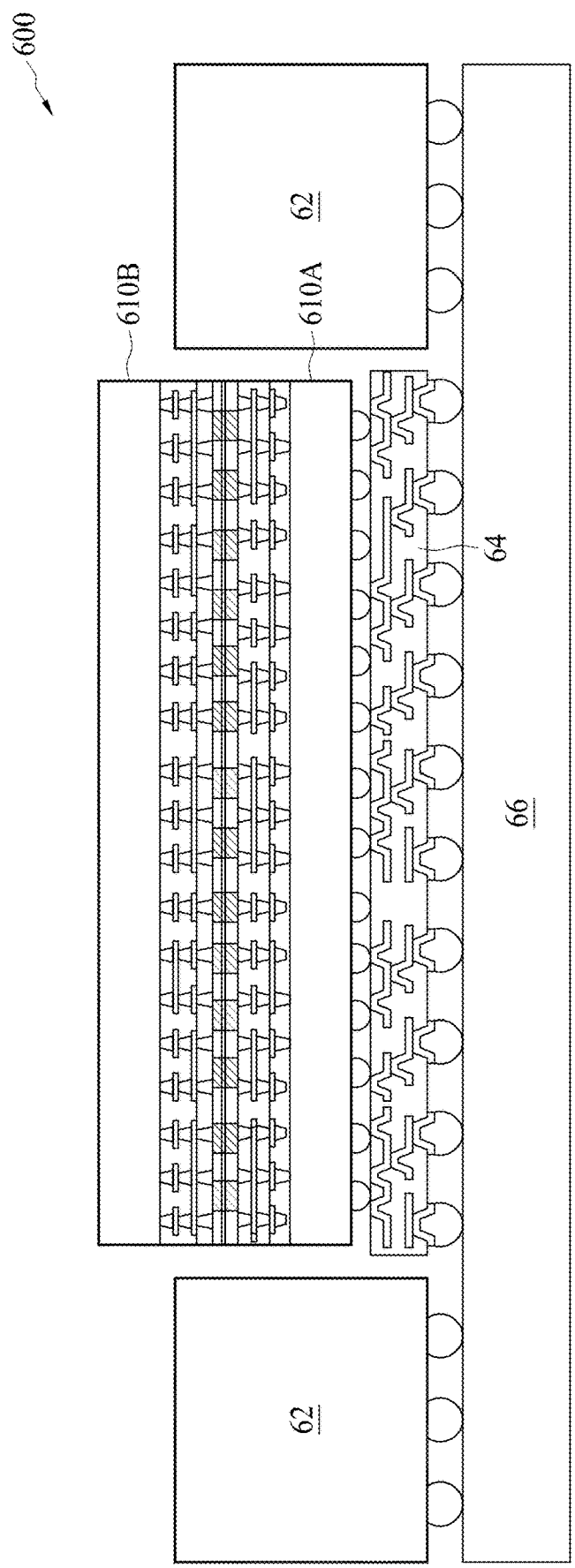
FIG. 19 shows a cross-sectional view of the semiconductor device in FIG. 18.

FIG. 19 shows a cross-sectional view of the semiconductor device 60. In the present embodiment, the semiconductor structure 600 can be placed on a supporting substrate 64 and can be packaged in one chip, and the DRAMs 62 can be packaged in other chips. In such case, the semiconductor structure 600 and the DRAMs 62 can be installed on the circuit board 66 with solder contacts, such as solder balls SB. That is, the DRAMs 62 can be coupled to computation circuits 620A and 620B through the circuit board 66 as shown in FIG. 19.

In summary, the semiconductor structures and the semiconductor devices provided by the embodiments of the present disclosure can include dies having device layers and RDLs manufactured by a same set of masks, thereby simplifying manufacturing processes and reducing manufacturing costs. Furthermore, while dies inside a same semiconductor structure can communicate with each other through intra-stack connection circuits, dies of different semiconductor structures can also communicate with each other through inter-stack connection circuits, and the semiconductor device is able to allow data sharing among multiple cores, thereby providing great flexibility for hardware arrangement and improving computation performance.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A semiconductor structure comprising:
    a first die comprising:
        a first substrate;
        a first device layer disposed on the first substrate;
        a first redistribution layer (RDL) disposed on the first device layer, wherein a first computation circuit, a first memory circuit, and a first intra-stack connection circuit are formed in the first device layer and the first RDL; and
        a plurality of through silicon vias (TSVs) at least passing through the first substrate; and
    a second die stacked on the first die, and comprising:
        a second substrate;
        a second device layer disposed on the second substrate; and
        a second RDL disposed on the second device layer, wherein a second computation circuit, a second memory circuit, and a second intra-stack connection circuit are formed in the second device layer and the second RDL;
    wherein:
    from a top view, pads of the second intra-stack connection circuit are aligned with pads of the first intra-stack connection circuit, and the first computation circuit is coupled to the second computation circuit and the second memory circuit through the first intra-stack connection circuit and the second intra-stack connection circuit; and
    structures of the first device layer and the first RDL are replica of structures of the second device layer and the second RDL.

2. The semiconductor structure of claim 1, wherein from the top view:
    a floorplan of the first computation circuit overlaps a floorplan of the second memory circuit; and
    a floorplan of the second computation circuit overlaps a floorplan of the first memory circuit.

3. The semiconductor structure of claim 1, wherein:
    a first input/output circuit and a second input/output circuit are further formed in the first device layer and the first RDL;
    a third input/output circuit and a fourth input/output circuit are further formed in the second device layer and the second RDL; and
    the first computation circuit is coupled to one of the first input/output circuit, the second input/output circuit, the third input/output circuit and the fourth input/output circuit, and the second computation circuit is coupled to another one of the first input/output circuit, the second input/output circuit, the third input/output circuit and the fourth input/output circuit.

4. The semiconductor structure of claim 3, wherein from the top view:
    floorplans of the first input/output circuit and the second input/output circuit are at peripheral regions of the first die; and
    floorplans of the third input/output circuit and the fourth input/output circuit are at peripheral regions of the second die.

5. The semiconductor structure of claim 1, wherein:
    a first physical interface circuit and a second physical interface circuit are further formed in the first device layer and the first RDL;
    a third physical interface circuit and a fourth physical interface circuit are further formed in the second device layer and the second RDL; and
    the first computation circuit is coupled to one of the first physical interface circuit, the second physical interface circuit, the third physical interface circuit, and the fourth physical interface circuit, and the second computation circuit is coupled to another one of the first physical interface circuit, the second physical interface circuit, the third physical interface circuit, and the fourth physical interface circuit.

6. The semiconductor structure of claim 5, wherein from the top view:
    floorplans of the first physical interface circuit and the second physical interface circuit are at peripheral regions of the first die; and
    floorplans of the third physical interface circuit and the fourth physical interface circuit are at peripheral regions of the second die.

7. The semiconductor structure of claim 1, wherein:
    the second RDL of the second die faces the first RDL of the first die.

8. The semiconductor structure of claim 7, wherein:
    a first input/output circuit, a second input/output circuit, a first physical interface circuit, and a second physical interface circuit are further formed in the first device layer and the first RDL;
    a third input/output circuit, a fourth input/output circuit, a third physical interface circuit, and a fourth physical interface circuit are further formed in the second device layer and the second RDL;
    the first computation circuit is coupled to the third input/output circuit and the third physical interface circuit; and
    the second computation circuit is coupled to the fourth input/output circuit and the fourth physical interface circuit.

9. The semiconductor structure of claim 7, wherein:
    the pads of the first intra-stack connection circuit correspond to a plurality of dual-direction connection ports; and
    the pads of the second intra-stack connection circuit correspond to a plurality of dual-direction connection ports.

10. The semiconductor structure of claim 1, wherein:
    the second RDL of the second die faces the first substrate of the first die.

11. The semiconductor structure of claim 10, wherein:
a first input/output circuit, a second input/output circuit, a first physical interface circuit, and a second physical interface circuit are further formed in the first device layer and the first RDL;
a third input/output circuit, a fourth input/output circuit, a third physical interface circuit, and a fourth physical interface circuit are further formed in the second device layer and the second RDL;
the first computation circuit is coupled to the first input/output circuit and the first physical interface circuit; and
the second computation circuit is coupled to the second input/output circuit and the second physical interface circuit, or is coupled to the third input/output circuit and the third physical interface circuit.

12. The semiconductor structure of claim 11, wherein from the top view:
floorplans of the plurality of TSVs do not overlap floorplans of the first input/output circuit and the first physical interface circuit.

13. The semiconductor structure of claim 10, wherein:
the pads of the first intra-stack connection circuit correspond to a plurality of pairs of single-direction connection ports;
the pads of the second intra-stack connection circuit correspond to a plurality of pairs of single-direction connection ports; and
each pair of single-direction connection ports comprises a transmitting port and a receiving port.

14. A semiconductor device comprising:
at least one dynamic random-access memory (DRAM); and
a first semiconductor structure comprising:
  a first die comprising:
    a first substrate;
    a first device layer disposed on the first substrate;
    a first redistribution layer (RDL) disposed on the first device layer, wherein a first computation circuit, a first memory circuit, and a first intra-stack connection circuit are formed in the first device layer and the first RDL; and
    a plurality of through silicon vias (TSVs) at least passing through the first substrate; and
  a second die stacked on the first die, and comprising:
    a second substrate;
    a second device layer disposed on the second substrate; and
    a second RDL disposed on the second device layer, wherein a second computation circuit, a second memory circuit, and a second intra-stack connection circuit are formed in the second device layer and the second RDL;
wherein:
the at least one DRAM is coupled to the first computation circuit;
from a top view, pads of the second intra-stack connection circuit are aligned with pads of the first intra-stack connection circuit, and the second computation circuit is coupled to the first computation circuit and the first memory circuit through the first intra-stack connection circuit and the second intra-stack connection circuit; and
structures of the first device layer and the first RDL are replica of structures of the second device layer and the second RDL.

15. The semiconductor device of claim 14, further comprising an interposer, wherein:
the first semiconductor structure is disposed on the interposer; and
the at least one DRAM is a high-bandwidth memory (HBM) and is coupled to the first computation circuit or the second computation circuit through the interposer.

16. The semiconductor device of claim 15, further comprising:
a second semiconductor structure disposed on the interposer;
wherein the first semiconductor structure is a replica of the second semiconductor structure.

17. The semiconductor device of claim 16, wherein:
the first semiconductor structure further comprises a first inter-stack connection circuit coupled to the first computation circuit;
the second semiconductor structure comprises a third computation circuit, and a second inter-stack connection circuit coupled to the third computation circuit; and
the first inter-stack connection circuit is coupled to the second inter-stack connection circuit through the interposer.

18. The semiconductor device of claim 16, wherein from the top view:
a floorplan of the first inter-stack connection circuit is near a first edge of the first semiconductor structure;
a floorplan of the second inter-stack connection circuit is near a second edge of the second semiconductor structure; and
the first semiconductor structure and the second semiconductor structure are disposed side-by-side on the interposer with the first edge and the second edge near to and parallel with each other.

19. The semiconductor device of claim 15, further comprising:
a second semiconductor structure disposed on the interposer, wherein the second semiconductor structure comprises a third die and a fourth die stacked on the third die;
a third semiconductor structure disposed on the interposer, and comprising a fifth die, and a sixth die stacked on the fifth die; and
a fourth semiconductor structure disposed on the interposer, and comprising a seventh die, and an eighth die stacked on the seventh die;
wherein structures of device layers and RDLs of each of the second die, the third die, the fourth die, the fifth die, the sixth die, the seventh die, and the eighth die are replicas of the first device layer and the first RDL in the first die.

20. The semiconductor device of claim 19, wherein:
the second RDL of the second die faces the first RDL of the first die; and
a fourth RDL of the fourth die faces a third substrate of the third die.

21. The semiconductor device of claim 19, wherein:
the first semiconductor structure further comprises a first inter-stack connection circuit coupled to the first computation circuit, and a second inter-stack connection circuit coupled to the second computation circuit;
the second semiconductor structure further comprises a third computation circuit, and a third inter-stack connection circuit coupled to the third computation circuit;

the third semiconductor structure further comprises a fourth computation circuit, and a fourth inter-stack connection circuit coupled to the fourth computation circuit;

the first inter-stack connection circuit is coupled to the third inter-stack connection circuit through the interposer; and the second inter-stack connection circuit is coupled to the fourth inter-stack connection circuit through the interposer.

22. The semiconductor device of claim 21, wherein from the top view:

a floorplan of the first inter-stack connection circuit is near a first edge of the first semiconductor structure, a floorplan of the third inter-stack connection circuit is near a second edge of the second semiconductor structure, and the first semiconductor structure and the second semiconductor structure are disposed on the interposer with the first edge and the second edge near to and parallel with each other; and a floorplan of the second inter-stack connection circuit is near a third edge of the first semiconductor structure, a floorplan of the fourth inter-stack connection circuit is near a fourth edge of the third semiconductor structure, and the first semiconductor structure and the third semiconductor structure are disposed on the interposer with the third edge and the fourth edge near to and parallel with each other.

23. The semiconductor device of claim 21, wherein from the top view:

the first semiconductor structure is near the second semiconductor structure along a first direction, and the first semiconductor structure is near the third semiconductor structure along a second direction different from the first direction;

the third semiconductor structure is near the fourth semiconductor structure along the first direction, and the second semiconductor structure is near the fourth semiconductor structure along the second direction; and the first semiconductor structure is a replica of the fourth semiconductor structure, and the second semiconductor structure is a replica of the third semiconductor structure.

24. The semiconductor device of claim 14, further comprising a circuit board, wherein:

the at least one DRAM and the semiconductor structure are installed on the circuit board with solder contacts; and the at least one DRAM is a double-data-rate (DDR) synchronous DRAM (SDRAM) and is coupled to the first computation circuit or the second computation circuit through the circuit board.

* * * * *